(12) United States Patent
Doi

(10) Patent No.: US 6,570,356 B2
(45) Date of Patent: May 27, 2003

(54) ROBOT SYSTEM

(75) Inventor: Koji Doi, Kakogawa (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/824,760

(22) Filed: Apr. 4, 2001

(65) Prior Publication Data

US 2001/0033144 A1 Oct. 25, 2001

(30) Foreign Application Priority Data

| Apr. 7, 2000 | (JP) | ........................................ 2000-106611 |
| Jun. 30, 2000 | (JP) | ........................................ 2000-199368 |
| Sep. 13, 2000 | (JP) | ........................................ 2000-278565 |

(51) Int. Cl.[7] ................................................. B25J 9/18
(52) U.S. Cl. ............................. 318/568.11; 318/568.21; 901/27; 901/32; 901/40
(58) Field of Search ....................... 318/568.11, 568.21; 901/27, 32, 40; 414/744.5, 730, 5

(56) References Cited

U.S. PATENT DOCUMENTS

| 6,105,454 A | * | 8/2000 | Bacchi et al. | ................. 901/40 |
| 6,121,743 A | * | 9/2000 | Genov et al. | ................ 318/568 |
| 6,197,017 B1 | * | 3/2001 | Brock et al. | .................... 414/5 |

FOREIGN PATENT DOCUMENTS

| EP | 0 366 430 | | 5/1990 |
| EP | 0 629 475 | A1 | 12/1994 |
| EP | 0 913 236 | A2 | 5/1999 |
| JP | 09082780 | | 3/1997 |
| JP | 2001030190 | | 2/2001 |
| WO | WO 01/36165 | A1 | 5/2001 |

* cited by examiner

*Primary Examiner*—Karen Masih
(74) *Attorney, Agent, or Firm*—Oliff & Berridge,PLC

(57) ABSTRACT

The robot system including a 6-axis robot has a swingable arm for transferring a workpiece between first and second positions, a wrist on a distal end of the arm, that is driven to rotate around a predetermined axis, and a transfer device at the wrist. The transfer device has a link mechanism having first and second links and holding means attached to a distal end of the second link. A proximal end of the first link is attached to the wrist so as to rotate around the predetermined axis. A distal end of the first link and a proximal end of the second link are rotatably connected to each other. In accordance with a swinging motion of the arm, the first link rotates in a first rotational direction with respect to the arm and the second link rotates in a second rotational direction opposite to the first rotational direction with respect to the first link, so as to transfer the workpiece along a straight line linking the first and second positions.

15 Claims, 28 Drawing Sheets

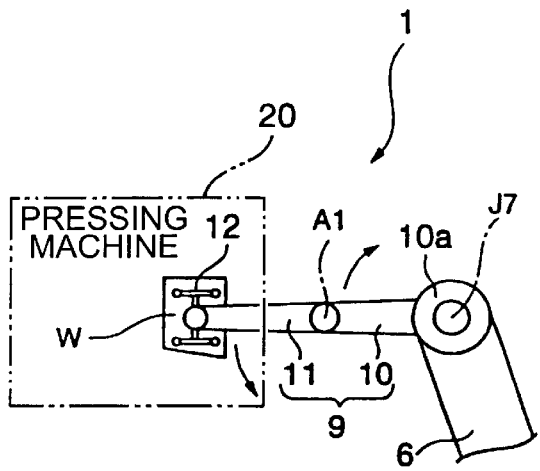
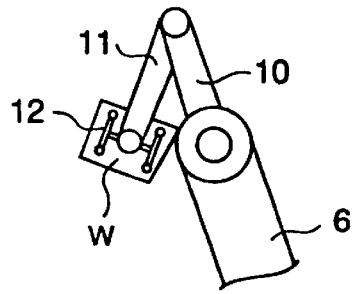
FIG. 4A  FIG. 4B
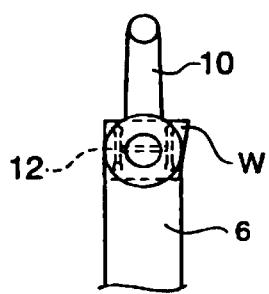
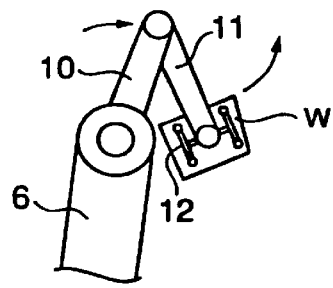
FIG. 4C  FIG. 4D
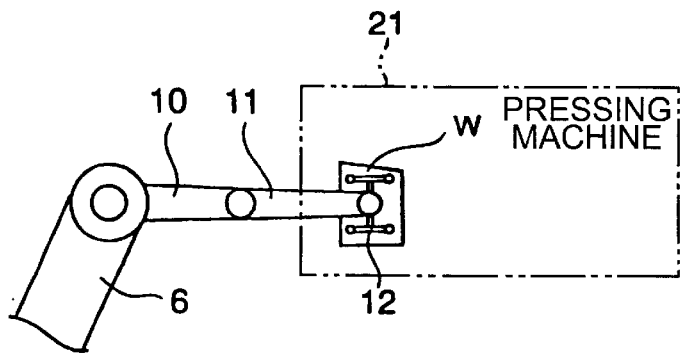
FIG. 4E

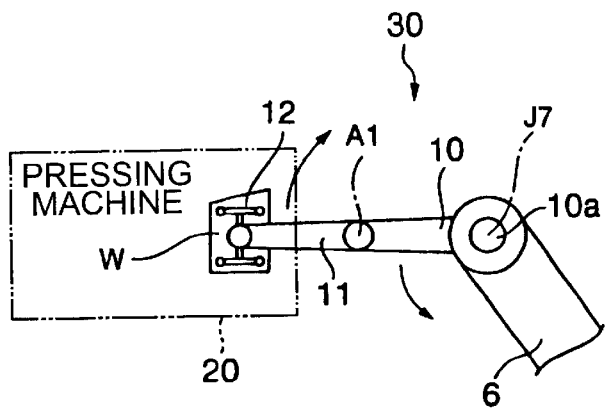
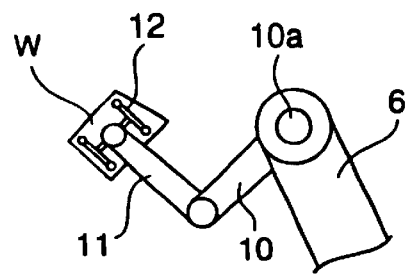
FIG. 7A          FIG. 7B
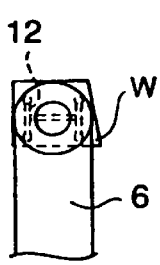
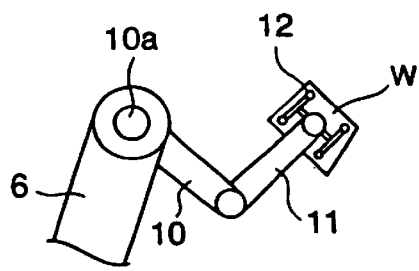
FIG. 7C          FIG. 7D
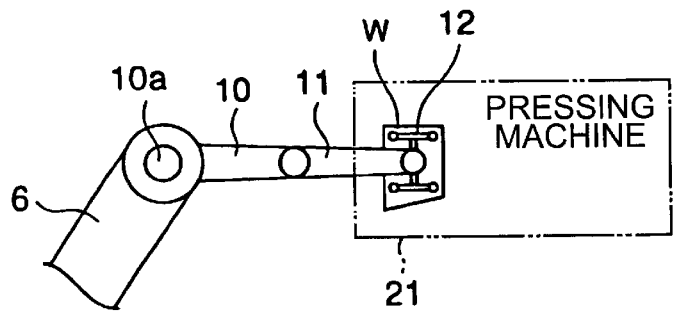
FIG. 7E

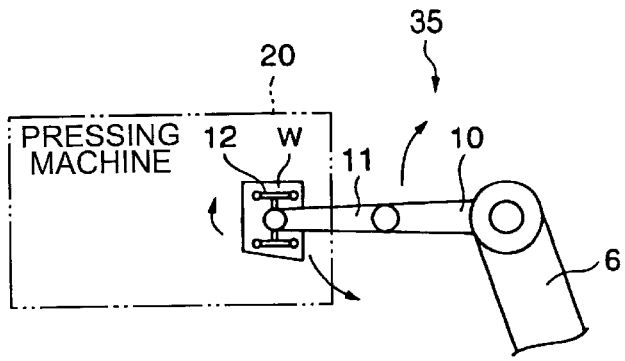
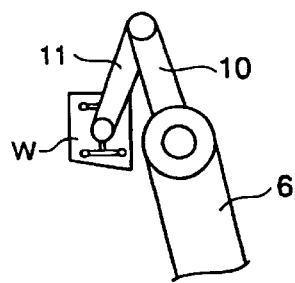
FIG. 8A          FIG. 8B
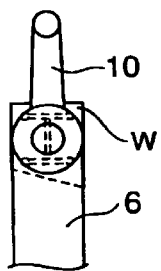
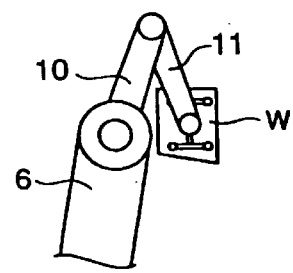
FIG. 8C          FIG. 8D
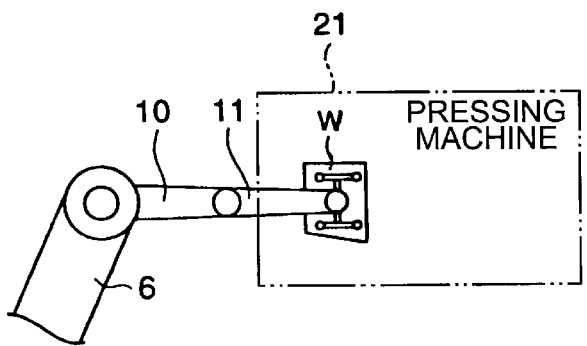
FIG. 8E

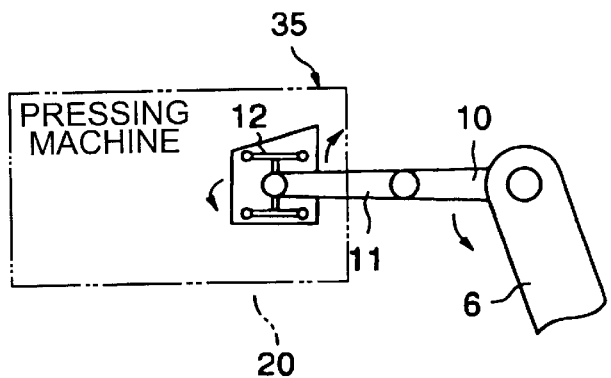
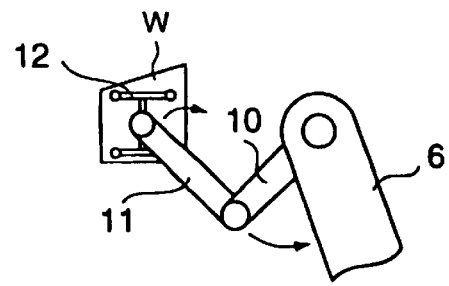
FIG. 12A          FIG. 12B
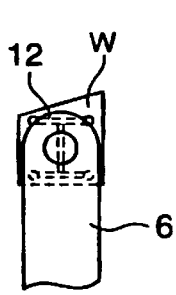
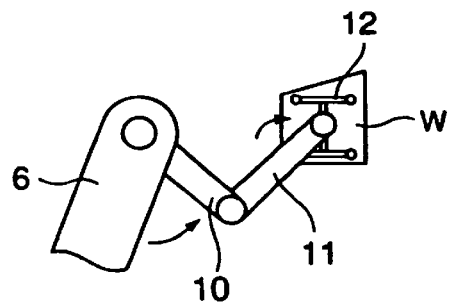
FIG. 12C          FIG. 12D
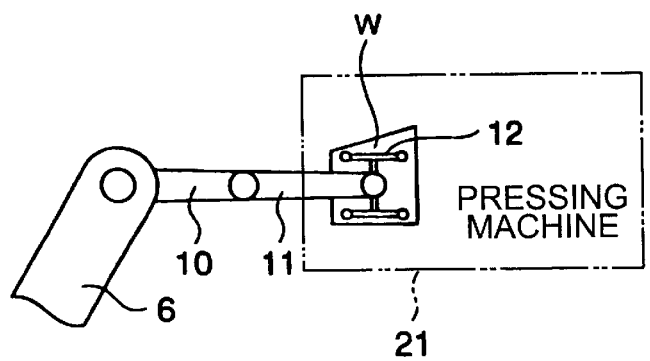
FIG. 12E

ROBOT SYSTEM

BACKGROUND OF THE INVENTION

1. Field of the Invention

The present invention relates to a robot system including a robot with a transfer device for transferring a workpiece.

2. Description of the Related Art

When transferring a workpiece between pressing machines, a robot for transferring the workpiece is installed between the pressing machines. In this case, when the space between the pressing machines is large, a transfer device is attached to the wrist of the robot and the transfer device and robot arm transfer the workpiece by their operation. An example of the related art of such a transfer device is disclosed in Japanese Utility Model Laid-Open Publication Hei4-42390, "Article Transfer Device".

The transfer device of the related art has a slider and holding means for holding a workpiece with absorbing force and moving along the slider. To transfer the workpiece, the robot moves the transfer device to the pressing machine on one side first and the holding means arranged at one end of the slider adsorbs and holds the workpiece of the pressing machine on one side. Next, the robot slides the holding means together with the workpiece to the other end of the slider and moves the transfer device to the pressing machine on the other side. When the workpiece reaches the pressing machine on the other side, the robot releases the workpiece from the holding means. In this way, even when the transfer distance is long, a workpiece can be transferred.

In the aforementioned conventional transfer device, there is a problem that the transfer speed is inevitably slow because the transfer device uses a screw thread to slide the holding means.

SUMMARY OF THE INVENTION

An object of the present invention is to provide a robot system having a faster transfer speed than that of a conventional robot system with the holding means which is slid by a screw thread.

According to the present invention, a robot system including a 6-axis robot, includes: a swingable arm for transferring a workpiece between a first position and a second position, a wrist mounted on a distal end of said arm, said wrist being driven to rotate around a predetermined axis, and a transfer device disposed at said wrist, wherein said transfer device has a link mechanism having a first link and a second link and holding means attached to a distal end of said second link, wherein a proximal end of said first link is attached to said wrist so as to rotate around said predetermined axis, wherein a distal end of said first link and a proximal end of said second link are rotatably connected to each other, and wherein, in accordance with a swinging motion of said arm, said first link rotates in a first rotational direction with respect to said arm and said second link rotates in a second rotational direction opposite to said first rotational direction with respect to said first link, so as to transfer the workpiece along a straight line linking said first position and said second position.

Preferably, said proximal end of said first link is fixed to said wrist and said first link rotates with respect to said arm by driving said wrist to rotate.

Preferably, the robot system further includes rotation transmitting means for transmitting a rotation of said first link with respect to said arm to said second link, thereby rotating said second link with respect to said first link.

Preferably, assuming a swinging angle of said arm from a central position between said first position and said second position as $\alpha$, said wrist is controlled to rotate so that a rotational angle of said first link with respect to said arm becomes $(90-\alpha)/\alpha$ times of said swinging angle $\alpha$ of said arm, and said rotation transmitting means is set so that a rotational angle of said second link with respect to said first link becomes $180/(90-\alpha)$ times of said rotational angle of said first link with respect to said arm.

Preferably, said holding means is rotatably disposed at said distal end of said second link and said holding means rotates so that a direction of said workpiece held by said holding means in an absolute coordinate system is always kept constant by setting a rotational angle of said holding means with respect to said second link to become ½ times of said rotational angle of said second link with respect to said first link.

Preferably, the robot system further includes link rotation means having a seventh axis for driving said link mechanism, wherein, when transferring said workpiece, said link rotation means drives one of said first link and said second link to rotate and said wrist drives the other of said first link and said second link to rotate.

Preferably, assuming a swinging angle of said arm from a central position between said first position and said second position as $\theta$, a rotational angle of said first link with respect to said arm as $\theta 1$, and a rotational angle of said second link with respect to said first link as $\theta 2$, said link rotation means drives either of said first link and said second link to rotate so that $\theta 2 = 2(\theta + \theta 1)$ is held.

Preferably, said holding means is rotatably disposed at said distal end of said second link and said holding means rotates so that a direction of said workpiece held by said holding means in an absolute coordinate system is always kept constant by setting a rotational angle of said holding means with respect to said second link to become ½ times of said rotational angle of said second link with respect to said first link.

Preferably, when said wrist is moved along said straight line at a constant speed to transfer said workpiece, rotational speeds of said first and second links of said link mechanism can be controlled independently of a rotational speed of said wrist.

Preferably, the robot system further includes a base fixed to said wrist and link rotation means having a seventh axis for driving said link mechanism, wherein said proximal end of said first link is rotatably disposed at said base, and wherein, when transferring said workpiece, said link rotation means drives said first link to rotate with respect to said base and a rotation of said first link with respect to said base is transmitted to said second link, thereby rotating said second link.

Preferably, said wrist controls a rotation of said base so that a direction of said base in an absolute coordinate system is always kept constant during a transfer of said workpiece.

Preferably, when said wrist is moved along said straight line at a constant speed to transfer said workpiece, rotational speeds of said first and second links of said link mechanism can be controlled independently of a rotational speed of said wrist.

Preferably, when transferring said workpiece, said wrist is moved at a constant speed and a rotational speed of said first link with respect to said arm when said wrist is in a neighborhood of said first position and said second position is lower than the rotational speed when said wrist is in a neighborhood of a central position between said first position and said second position.

Preferably, when transferring said workpiece, a moving speed of said wrist when said wrist is in a neighborhood of said first position and said second position is higher than the moving speed when said wrist is in a neighborhood of a central position between said first position and said second position and thereby a rotational speed of said first link with respect to said arm is kept substantially constant.

Preferably, said link mechanism comprises at least three links including said first link and said second link, said at least three links being connected in series.

According to the present invention having the aforementioned constitution, the link mechanism is installed at the distal end of the arm and a workpiece can be transferred by the swinging operation of the arm and the operation of the link mechanism, so that, compared with the conventional robot system with the holding means slid by a screw thread, the transfer speed can be increased drastically. Further, the link mechanism can be lightened easily and the load on the arm can be reduced, thus the dynamic characteristic of the robot system can be improved.

Further, if the link mechanism is structured so as to be driven by the wrist, an additional drive motor is not necessary for driving the link mechanism, and there is no need to control an additional drive motor separately from the 6-axis robot motor, and the control of the robot system can be simplified.

Further, if the link mechanism is structured so as to be driven by the link rotation means having the seventh axis, the rotational speeds of the first and second links of the link mechanism can be controlled individually.

Further, if the direction of a workpiece held by the holding means in the absolute coordinate system is always kept constant during transfer, the workpiece can be transferred between the first position and the second position without being inverted.

Further, when the wrist is in the neighborhood of the first position and second position, the rotational speeds of the first and second links are made lower, thereby the vibration of the first and second links can be reduced and the workpiece stop precision can be improved. In the neighborhood of the central position between the first position and the second position, since the first link and second link lie on top of one another with high rigidity, even if the rotational speeds of the first and second links are high, the link mechanism can sufficiently withstand the reaction force caused by rotation.

Further, since the workpiece is transferred along a straight line, the workpiece can be free from the centrifugal force and the transfer route can be minimized.

BRIEF DESCRIPTION OF THE DRAWINGS

FIGS. 4A to 4E are drawings showing the transfer process by the transfer device 1.

FIGS. 7A to 7E are drawings showing the transfer process of another embodiment of the transfer device 1.

FIGS. 8A to 8E are drawings showing the transfer process by the transfer device 35.

FIGS. 12A to 12E are drawings showing the transfer process of another embodiment of the transfer device 35.

DESCRIPTION OF THE PREFERRED EMBODIMENTS

The operation of the transfer device of the robot system of an embodiment of the present invention will be explained hereunder by referring to FIG. 1. The robot arm swings between the first position (on the left of FIG. 1) and the second position (on the right of FIG. 1), and the link mechanism of the transfer device operates synchronously with this swing motion of the robot arm. When the arm is positioned on the first position side, the link mechanism operates so as to extend toward the first position, and when the arm is positioned on the second position side, the link mechanism operates so as to extend toward the second position.

Figure 1:
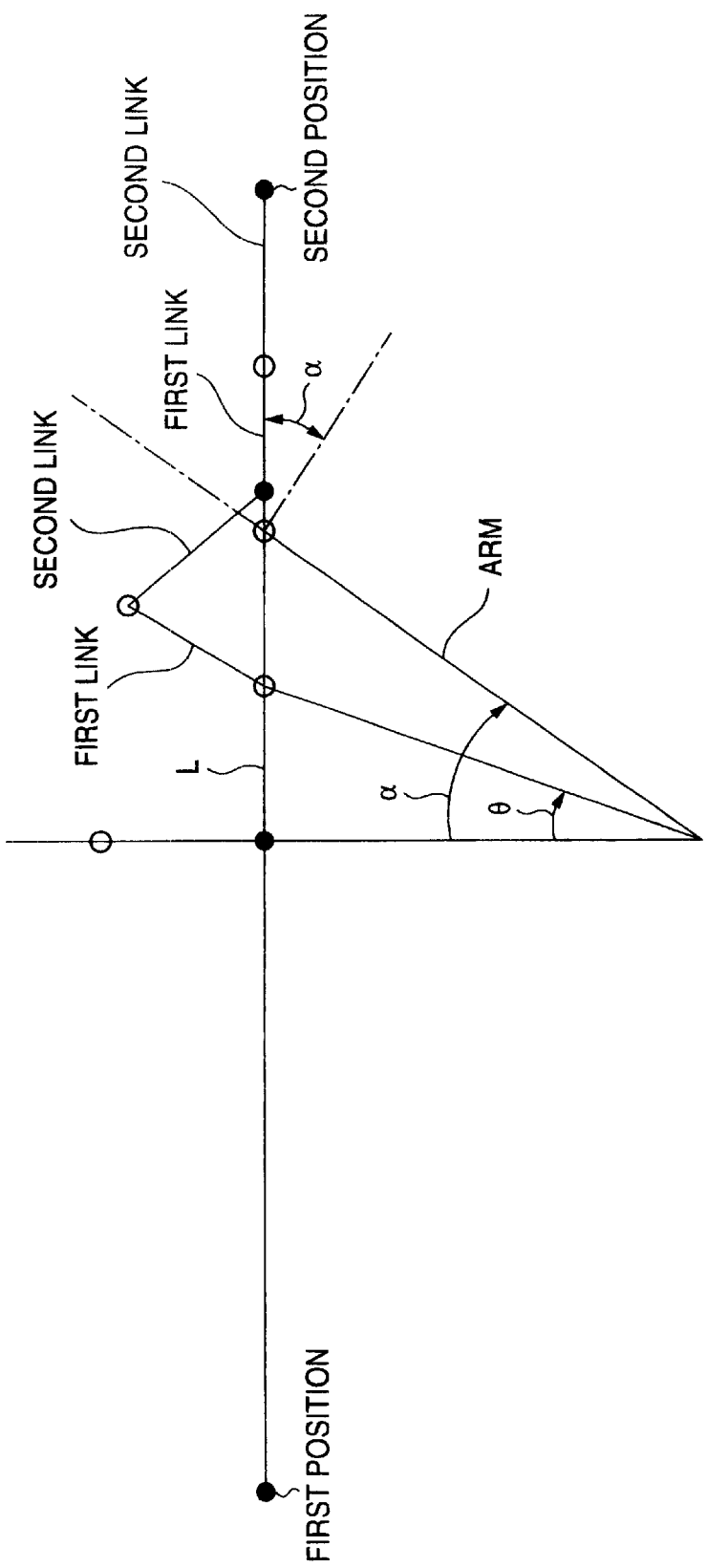
FIG. 1 is a drawing for explaining the operation of the robot system of the present invention.

In FIG. 1, when the robot arm is positioned at the center between the first position and the second position, the links are perpendicular to a linear transfer route L connecting the first position and second position. At this time, the first link and the second link of the link mechanism are folded so as to be overlaid with each other and extended along the robot arm. The angle of the arm at this time is assumed as 0° of the absolute coordinate and the swing angle when the link is at the second position is assumed as $\alpha°$.

When the arm is rotated in an $\alpha°$ arc from 0° to the second position, to move an article to be transferred which is held at the distal end of the second link along the transfer route L, while the arm swings from 0° to $\alpha°$, the first link must rotate in a (90−$\alpha$) arc with respect to the arm. Namely, the first link must rotate (90−$\alpha$)/$\alpha$ times of the swing angle of the arm.

In the same way, while the arm swings from 0° to $\alpha°$, the second link must rotate in a 180° arc with respect to the first link. Namely, the second link must rotate 180/(90−$\alpha$) times of the rotational angle of the first link with respect to the arm.

Therefore, when the first link is controlled so as to be (90−$\alpha$)/$\alpha$ times of the swing angle of the arm and the rotational angle of the second link is controlled so as to be 180/(90−$\alpha$) times of the rotational angle of the first link with respect to the arm, the holding means installed at the distal end of the second link can move linearly from the first position to the second position.

The operation of the holding means will be explained by referring to FIG. 1. The rotation of the second link with respect to the first link is transmitted to the holding means by the rotation transmitting means and the holding means also rotates synchronously with the swing of the arm. To keep the direction of an article to be transferred which is held by the holding means unchanged during transfer, when the robot arm rotates from 0° to $\alpha°$ and the second link rotates in a 180° arc with respect to the first link, the holding means must rotate in a 90° arc with respect to the second link. Namely, the holding means rotates ½ times of the rotational angle of the second link with respect to the first link.

Therefore, when the rotation transmitting means for the holding means is set so that the rotational angle of the second link with respect to the first link is enlarged to ½ times and transferred to the holding means, the article to be transferred can be transferred free of inversion without being changed in direction.

Figure 2:
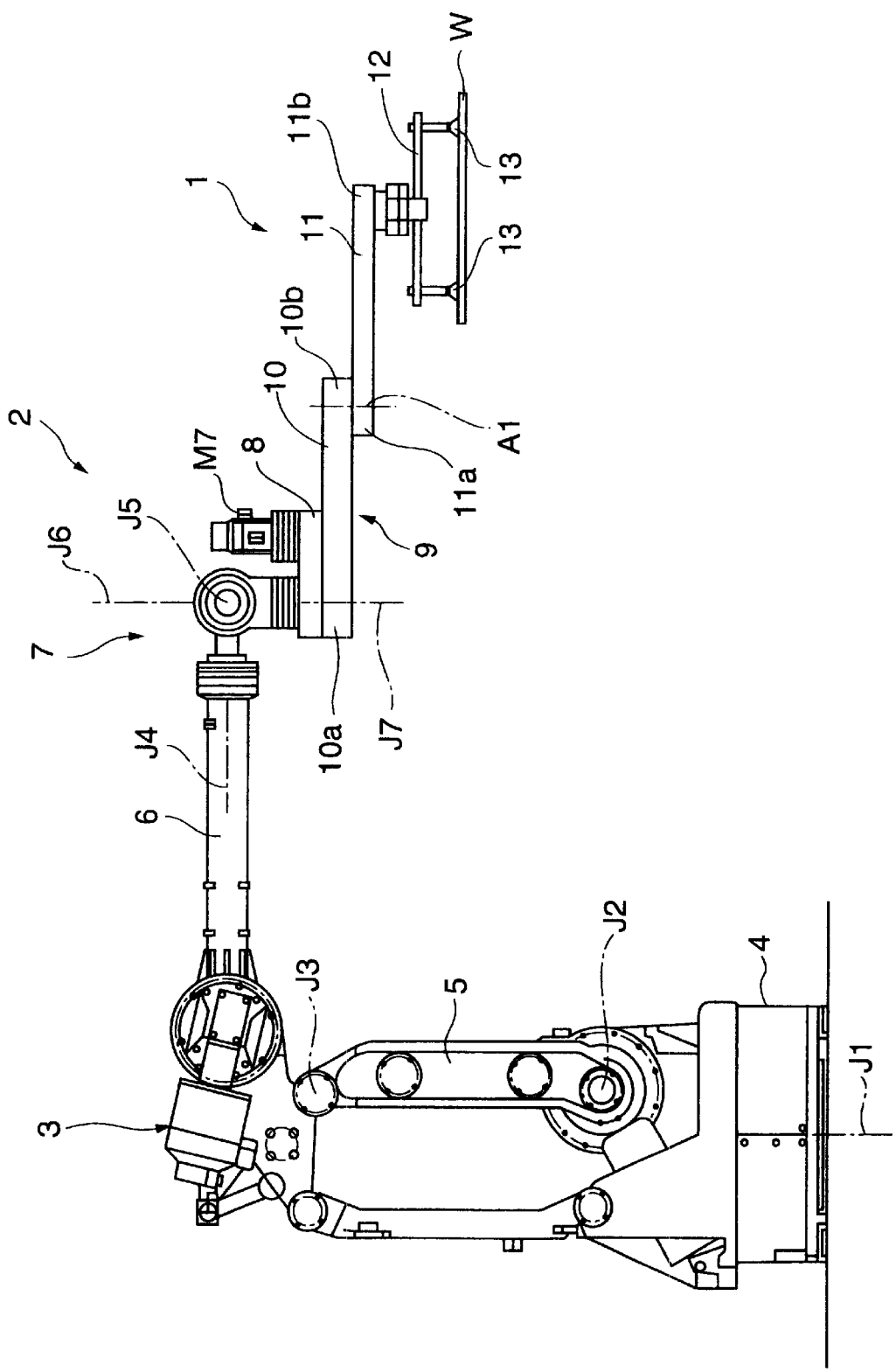
FIG. 2 is a side view showing the robot system 2 using the transfer device 1, which is an embodiment of the present invention.
Figure 3:
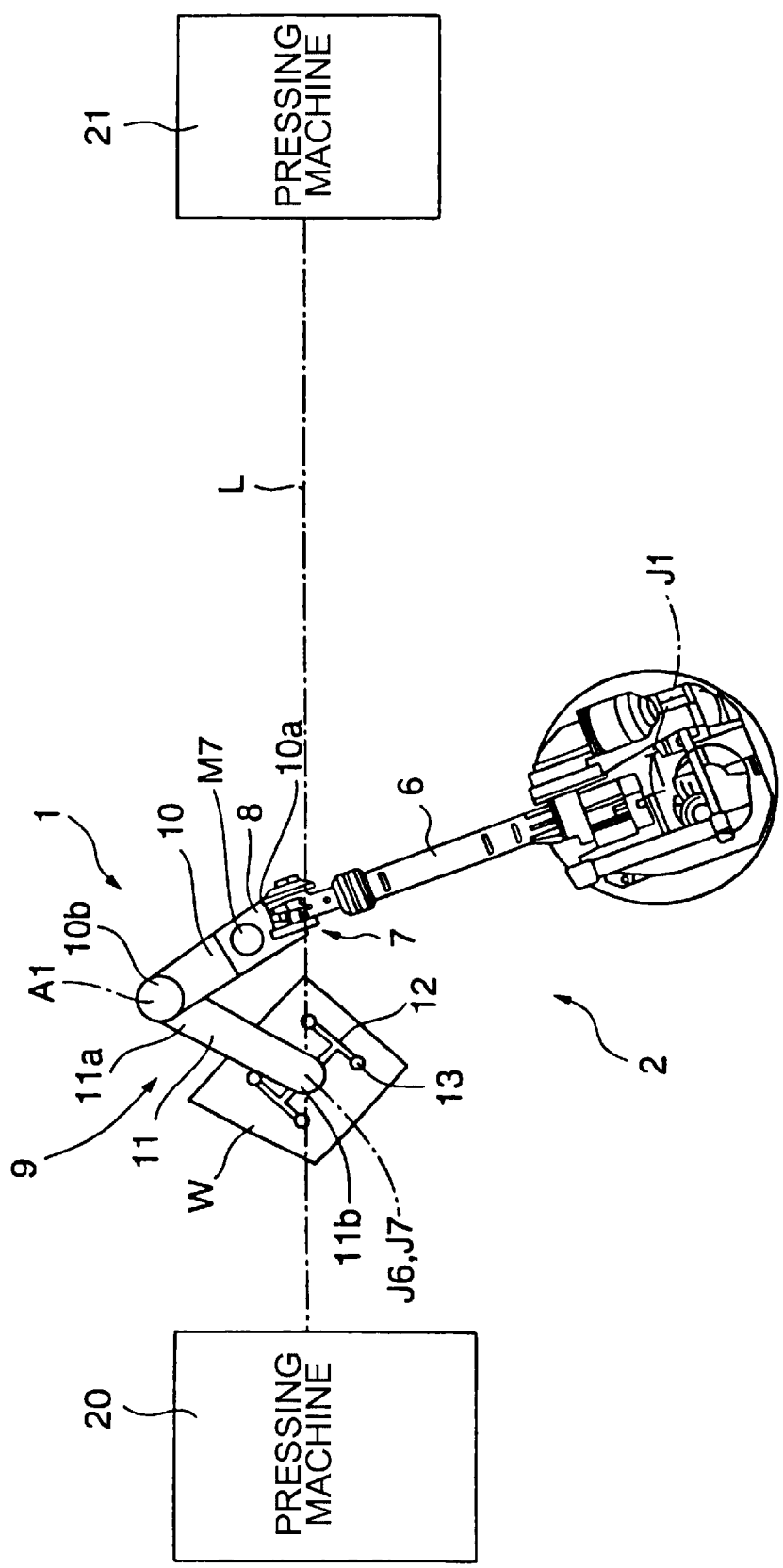
FIG. 3 is a plan view of the robot system 2.

FIG. 2 is a side view showing the robot system 2 having the transfer device 1 whose operation is explained by referring to FIG. 1 and FIG. 3 that is a plan view thereof. The transfer device 1 is disposed at a wrist 7 of a robot 3 and used to transfer a workpiece W between a pair of pressing machines.

The robot 3 is a 6-axis multi-joint robot and has a base 4 to be fixed to the floor, a lower arm 5, an upper arm 6, and the wrist 7. The lower arm 5 is attached to the base 4 so as to rotate around a first axis J1. The lower arm 5 has a vertical lower that is installed on the base 4 so as to rotate in back-and-forth direction around a horizontal second axis J2. At the upper end of the lower arm 5, the proximal end of the upper arm 6 is attached so as to rotate vertically around a horizontal third axis J3. The wrist 7 is disposed at the distal end of the upper arm 6 so as to rotate around a fourth axis J4 parallel with the axis of the upper arm 6 and also to rotate around a fifth axis J5 perpendicular to the axis of the upper arm 6. The transfer device 1 is attached to the wrist 7 so as to rotate via a rotation connection 8.

The rotation connection 8 has a rotation drive source M7 composed of a servo motor and attaches the transfer device 1 to the wrist 7 so as to rotate around a seventh axis J7 concentrical with the sixth axis J6 of the wrist 7. The joint axes J1 to J6 of the robot 3 and the seventh axis J7 are individually driven to rotate by servo motors.

The transfer device 1 is composed of a link mechanism 9 composed of a first link 10 and a second link 11, and holding means 12 installed at the distal end of the second link 11. The rotation connection 8 is disposed at a base 10a of the first link 10, and the first link 10 is supported by the robot 3 so as to rotate around the seventh axis J7. The second link 11 has the same length as that of the first link 10, and a proximal end 11a of the second link 11 is attached at a distal end 10b of the first link 10 so as to rotate around a rotation axis A1 parallel with the seventh axis J7. The holding means 12 is attached at a distal end 11b of the second link 11. The holding means 12 has a plurality of suction pads 13 and can hold the workpiece W with these suction pads 13 in a removable state.

The robot 3 of the robot system 2 is installed at the center of the two pressing machines 20 and 21 and the workpiece w is transferred from the pressing machine 20 on one side (on the left of FIG. 3) to the pressing machine 21 on the other side (on the right of FIG. 3). The robot 3 holds the transfer device 1 almost horizontally so that the seventh axis J7 is set vertically, extends the link mechanism 9 toward the pressing machine 20 on one side, holds the workpiece W, contracts the link mechanism 9, extends it toward the other side, and transfers the workpiece W to the pressing machine 21 on the other side. After completion of transfer, the robot 3 extends the link mechanism 9 toward one side again and repeats the transfer operation. By this reciprocating motion, as shown in FIG. 3, the robot 3 can transfer the workpiece W along the linear transfer route L connecting a pair of the pressing machines 20 and 21.

Next, the transfer operation of the robot system 2 will be explained more in detail by referring to FIGS. 4A to 4E.

Firstly, to hold the workpiece W arranged on the pressing machine 20 on one side, as shown in FIG. 4A, the robot 3 extends the link mechanism 9 to the pressing machine 20 on one side. At this time, the first link 10 and the second link 11 of the link mechanism 9 are extended linearly along the transfer route L of the workpiece W. When the link mechanism 9 is extended like this, so that the holding means 12 installed at the distal end of the second link 11 can hold the workpiece W on the pressing machine 20 on one side, the robot 3 slants the upper arm 6 thereof holding the transfer device 1 on one side (on the left of FIG. 4A).

When the workpiece W is held by the suction pads 13 of the holding means 12 in this state and the first link 10 rotates in the first rotational direction (clockwise in FIG. 4A) around the seventh axis J7 at the proximal end 10a thereof, in link motion with it, the second link 11 rotates in the second rotational direction (counterclockwise in FIG. 4A) opposite to the first rotational direction around the rotation axis A1 at the proximal end 11a thereof. Then, the link mechanism 9 is folded and contracted as shown in FIG. 4B, and the workpiece W starts movement to the other side (the right of FIG. 4B). In this way, the link mechanism 9 is contracted, and the robot 3 rotates the upper arm 6 toward the other side, thereby the transfer device 1 moves in parallel with the transfer route L.

When the first link is further rotated in the first direction, as shown in FIG. 4C, the workpiece W reaches the center between the pressing machines 20 and 21. At this time, the link mechanism 9 is fully contracted and the first link 10 and the second link 11 of the link mechanism 9 are overlaid each other. At this time, the transfer device 1 is perpendicular to the transfer route L of the workpiece W and the workpiece W is positioned right under the proximal end 10a of the first link 10.

When the first link 10 is continuously rotated in the first rotational direction and the second link 11 is rotated in the second rotational direction, as shown in FIG. 4D, the link mechanism 9 begins extending toward the other side. Then, as shown in FIG. 4E, when the first link 10 and the second link 11 extend linearly, the workpiece W held at the distal end of the second link 11 reaches the pressing machine 21 on the other side. Here, when the holding condition by suction force of the holding means 12 is released, the workpiece W is loaded on the pressing machine 21 on the other side.

In this way, the first link 10 is rotated in a 180° arc from one side, and the link mechanism 9 extended toward one side is contracted and extended toward the other side, and the workpiece W can be transferred from one side to the other side. To return the holding means 12 to the pressing machine 20 on one side, the first link 10 is rotated this time in a 180° arc in the second rotational direction. By doing this, the link mechanism 9 is contracted at the center and further extended toward one side. In this way, the first link 10 is rotated in a 180° arc between one side and the other side, thereby the workpiece W can be transferred between the pressing machines 20, 21. The 180° reciprocating rotation of the first link 10 is carried out by the wrist 7 of the robot 3.

At the time of transfer, the robot 3 moves the wrist 7 linearly along the transfer route L so that the proximal end 10a of the first link 10 moves along the linear transfer route L of the workpiece W.

While the first link 10 rotates in the first rotational direction in a 90° arc in FIGS. 4A to 4C, the second link 11 rotates in the second rotational direction in a 180° arc. Namely, assuming the rotational angle of the first link 10 as θ, the rotational angle of the second link 11 is −2θ and while the first link 10 rotates in a 180° arc from one side to the other side, the second link 11 rotates in a 360° arc in the opposite direction. The rotation of the second link 11 is interlocked with the rotation of the first link 10.

Figure 5:
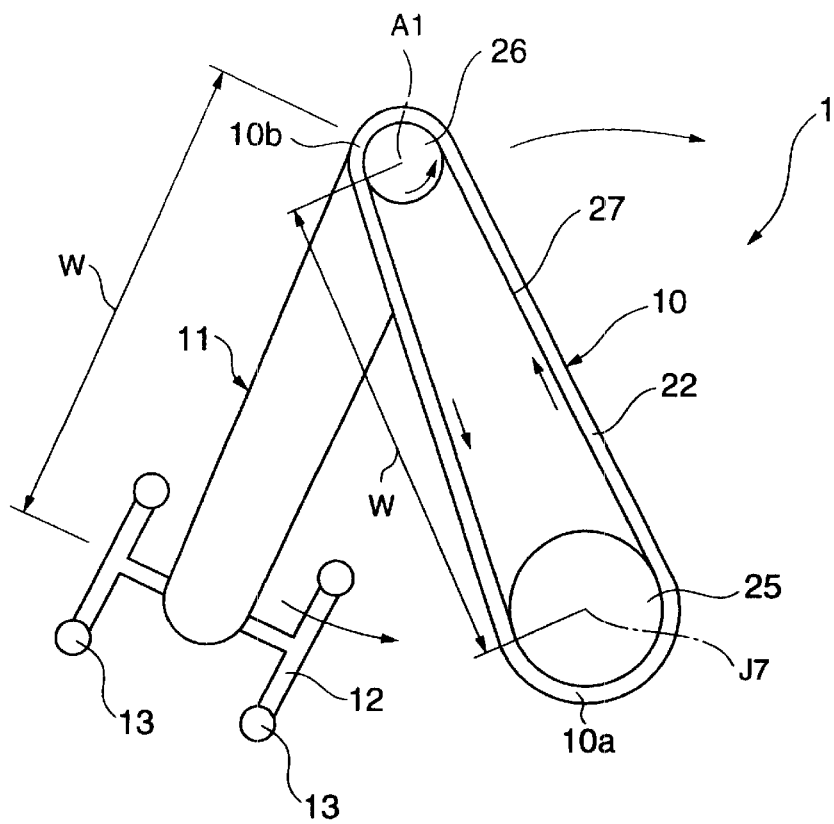
FIG. 5 is a plan view showing the internal mechanism of the transfer device 1.
Figure 6:
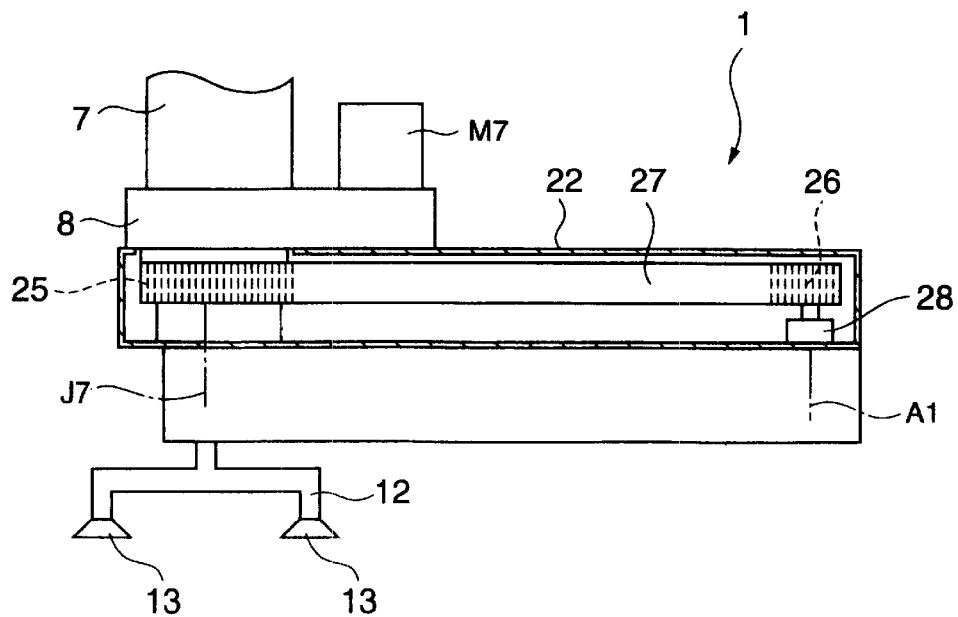
FIG. 6 is a side view showing the internal mechanism of the transfer device 1.

Next, the internal mechanism of the first link 10 and the second link 11 which rotate in link motion with each other will be explained. FIG. 5 is a plan view showing the internal mechanism of the transfer device 1 and FIG. 6 is a side view thereof.

The first link 10 has a hollow first link body 22 and is connected to the wrist 7 via the rotation connection 8. On the side of the proximal end 10a inside the first link body 22, a first solar gear 25 having the seventh axis J7 concentrically with the axis J6 of the wrist 7 as a rotation axis is installed. The first solar gear 25 is driven to rotate by the servo motor M7 of the rotation connection 8. At the distal end 10b of the first link body 22, a first planet gear 26, which is born so as to freely rotate around the rotation axis A1 parallel with the seventh axis J7, is installed and a timing belt 27 is wound between the first solar gear 25 and the first planet gear 26. The first planet gear 26 is born by a bearing 28 to the first link body 22 so as to freely rotate and fixed to the proximal end 10a of the second link 11 and the second link 11 rotates together with the first planet gear 26.

As mentioned above, the wrist 7 drives the first link 10 so as to rotate in a 180° arc, though the servo motor M7 of the rotation connection 8 rotates the first solar gear 25 so as to cancel the rotation of the first link 10 by the wrist 7. Namely, when the wrist 7 rotates in a 180° arc in the first rotational direction, the servo motor M7 rotates the first solar gear 25 in a 180° arc in the second rotational direction opposite to the first rotational direction and holds the first solar gear 25 fixedly, i.e., keeping it unrotated.

Since the timing belt 27 is wound between the first solar gear 25 and the first planet gear 26, as shown in FIG. 5, when the gear 25 is fixed and the first link 10 is rotated in the first rotational direction (clockwise in FIG. 5), the timing belt 27 rotates as indicated by the arrows shown in FIG. 5, thereby the first planet gear 26 rotates in the second rotational direction (counterclockwise). As mentioned above, the first planet gear 26 and the second link 11 are fixed and rotate integratedly, so that, when the first link 10 is driven to rotate in the first rotational direction, the second link 11 can be rotated in the second rotational direction in link motion with the first planet gear 26.

As shown in FIG. 5, the first solar gear 25 is larger than the first planet gear 26 and assuming the number of teeth of the first solar gear 25 as N, the number of teeth of the first planet gear 26 is N/2. Therefore, when the first link 10 rotates in a 180° arc, the first planet gear 26 rotates in a 360° arc. Namely, when the first link 10 rotates in a 180° arc in the first rotational direction, the second link 11 can rotate in a 360° arc in the second rotational direction. In this way, when the first link 10 is rotated in a 180° arc from one side to the other side as shown in FIGS. 4A to 4E, the second link 11 is rotated in a 360° arc in the opposite direction in link motion with it and the workpiece W can be transferred from one side to the other side. Further, since the length of the first link and the length of the second link are the same like W, when the first link 10 rotates in a 180° arc, the workpiece W held at the end of the second link 11 can move linearly.

FIGS. 7A to 7E are drawings showing the operation of the transfer device of another embodiment of the present invention. In this embodiment, only the operation of the transfer device 30 is different from the operation of the aforementioned embodiment. Namely, as shown in FIGS. 7A to 7E, the transfer device 30 is folded inside, whereas, as shown in FIGS. 4A to 4E, the transfer device 1 is folded outside the robot 3.

Namely, in this embodiment, when the workpiece W is transferred from one side to the other side, the first link 10 rotates counterclockwise and the second link 11 rotates clockwise. Also in this case, at the intermediate position, as shown in FIG. 7C, the first link 10 and the second link 11 are folded so as to be overlaid and the upper arm 6 of the robot 3 and the transfer device 30 are arranged in a straight line so as to be perpendicular to the transfer route L. Thereafter, the first link 10 is further rotated counterclockwise, and the transfer device 30 is extended toward the other side, and the workpiece W is transferred.

FIGS. 8A to 8E are drawings showing the operation of the transfer device 35 of another embodiment of the present invention. In the aforementioned transfer devices 1, 30 shown in FIGS. 4A to 4E or FIGS. 7A to 7E, during transfer from the pressing machine 20 on one side to the pressing machine 21 on the other side, the workpiece W is inverted in a 180° arc. On the other hand, in the transfer device 35 in this embodiment, the workpiece W is not inverted as shown in FIGS. 8A to 8E. The reason is that the holding means 12 is disposed at the distal end of the second arm 11 so as to rotate around the rotation axis A2 parallel with the seventh axis J7 and the holding means 12 rotate in link motion with the rotation of the first link 10 and the second link 11.

The operation will be explained more in detail hereunder. As shown in FIG. 8A, the transfer device 35 is extended toward the pressing machine 20 on one side, and the holding means 12 holds the workpiece W. The first link 10 rotates in the first rotational direction (clockwise in FIG. 8A), and the second link 11 rotates in the second rotational direction (counterclockwise in FIG. 8A), and the holding means 12 rotates in the first direction (clockwise in FIG. 8A). When the holding means 12 rotates like this, the workpiece W moves while keeping its direction as the original direction.

When the first link 10 is further rotated in the first direction, via the state shown in FIG. 8B, the transfer device 35 is folded at the center between the pressing machines 20 and 21 as shown in FIG. 8C. At this time, the upper arm 6 of the robot 3 and the first link 10 and second link 11 of the transfer device 35 are folded perpendicularly to the transfer route.

When the first link 10 is further rotated in the first direction, the transfer device 35 is extended toward the other side with the workpiece W kept in the same direction. By doing this, via the state shown in FIG. 8D, the first link 10 and the second link 11 are extended until they are arranged in a straight line and the workpiece W is transferred to the pressing machine 21 on the other side. As shown in FIG. 8E, the direction of the workpiece W after transfer completion is the same direction as that of the workpiece W at the time of transfer start shown in FIG. 8A. As mentioned above, in the transfer device 35, the holding means 12 is rotated in link motion with the rotation operation of the first and second links 10 and 11, thereby the workpiece W is always kept fixed in direction during transfer and can be transferred from one side to the other side free of inversion.

At the time of transfer of the workpiece W from one side to the other side, the first link 10 rotates in the first rotational direction (clockwise) and the second link 11 rotates in a 360° arc in the second rotational direction (counterclockwise) with respect to the first link 10. At this time, as shown in FIGS. 8A to 8E, the holding means 12 rotates in a 180° arc in the first rotational direction (clockwise) with respect to the second link 11. Namely, assuming the rotational angle of the first link 10 as θ, the rotational angle of the second link 11 is −2θ and the rotational angle of the holding means 12 is θ. Next, the rotational mechanism of the second link 11 and the holding means 12 rotating in link motion with such rotation of the first link 10 will be explained.

Figure 9:
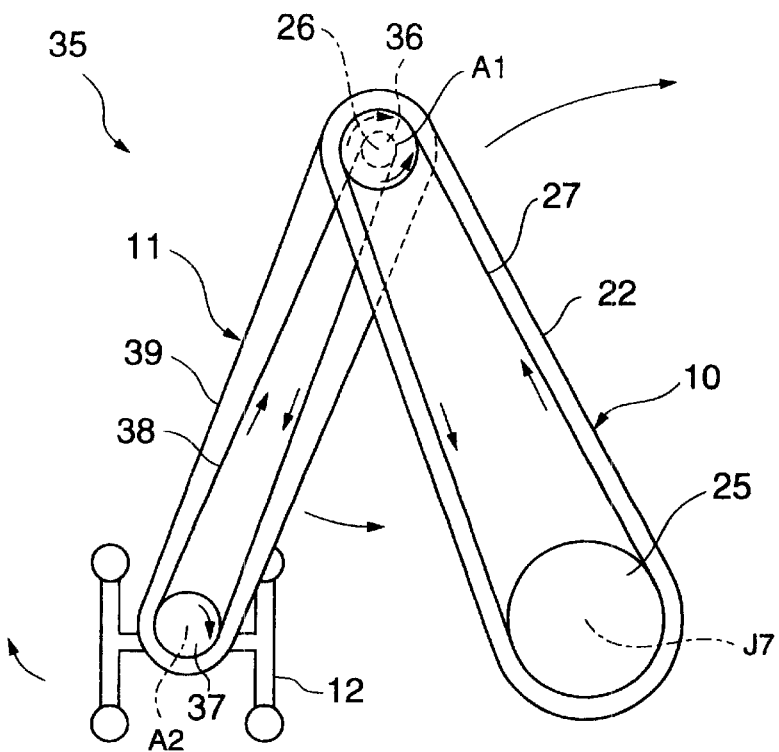
FIG. 9 is a plan view showing the internal mechanism of the transfer device 35.
Figure 10:
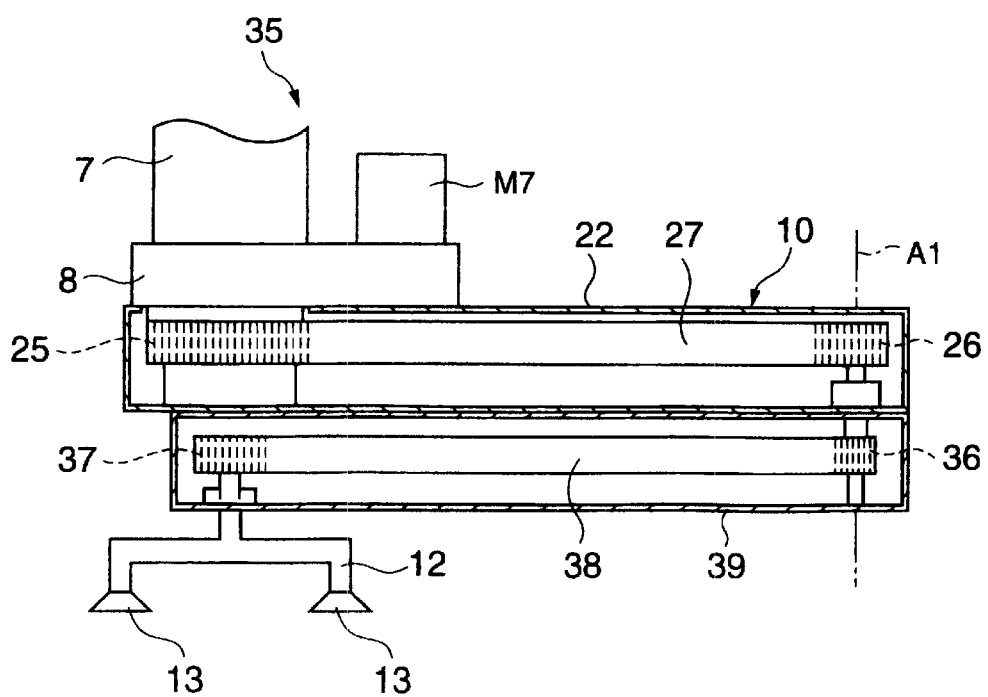
FIG. 10 is a side view showing the internal mechanism of the transfer device 35.

FIG. 9 is a plan view showing the internal mechanism of the transfer device 35. FIG. 10 is a side view thereof. The second link 11 moving in link motion with the first link 10 has the same mechanism as that of the transfer device 1 mentioned above. Namely, the first link 10 is rotated by the first solar gear 25 installed at the proximal end of the first link body 22, the first planet gear 26 which is installed at the distal end of the first link body 22 and rotated together with the second link 11, and the timing belt wound round the gears 25 and 26, thereby the second link 11 is rotated.

Figure 11:
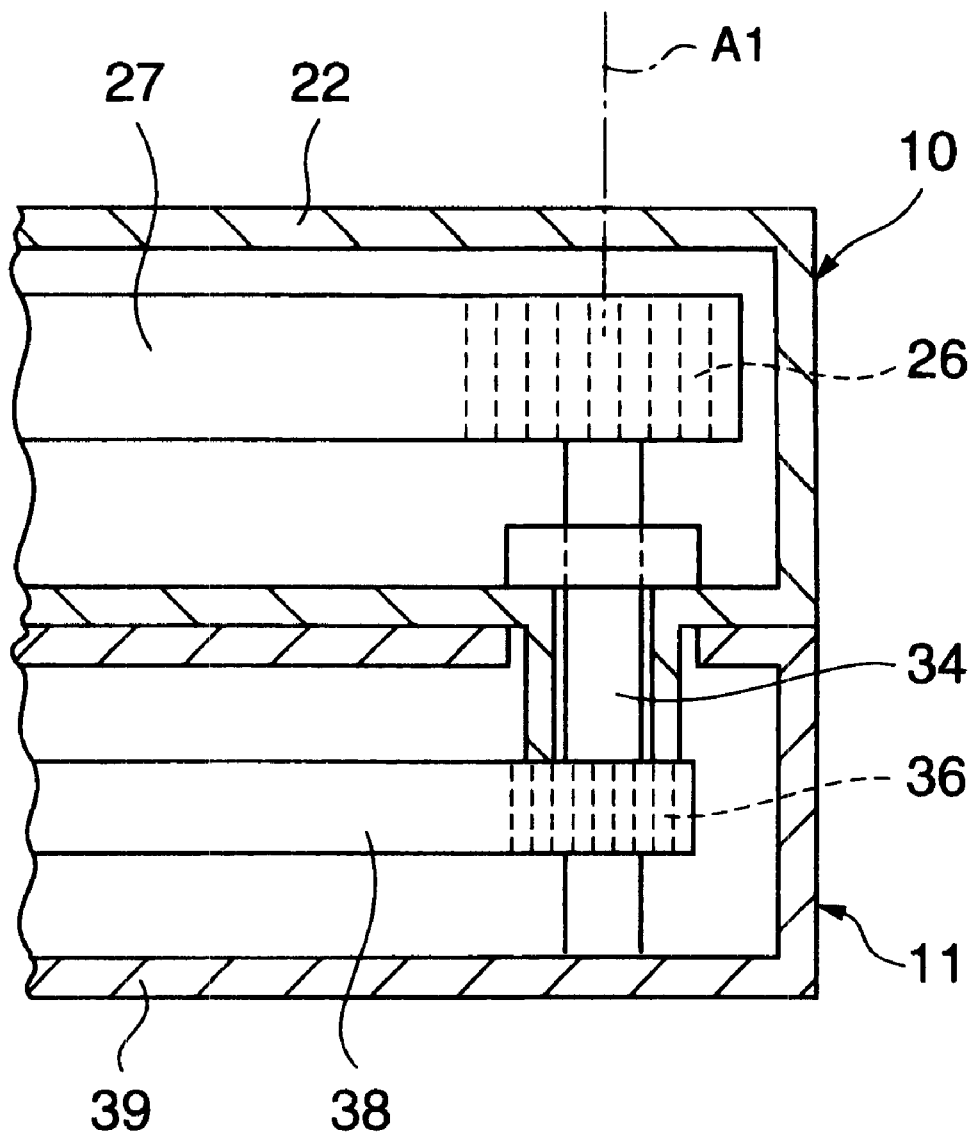
FIG. 11 is a cross sectional view showing the neighborhood of the first planetary gear 26 and the second solar gear 36 of the transfer device 35.

The rotation of the holding means 12 uses the same mechanism. Namely, a second solar gear 36 is installed at the proximal end of a hollow second link body 39, and a second planet gear 37 is installed at the distal end thereof, and a timing belt 38 is wound round them. As shown in FIG. 11, the second solar gear 36 is fixedly connected to the first link body 22 and rotates together with the first link 10. Although the first planet gear 26 and the second solar gear 36 have the rotation axis A1 in common, as shown in FIG. 11, the first planet gear 26 is fixedly connected to the second link body 39 via an axis 34 and rotates around the rotation axis A1 together with the second link 11. However, the second solar gear 36 is fixedly connected to the first link body 22 and integrated with the first link 10. The second planet gear 37 is born by the second link body 39 at the distal end 11b of the body of the second link 11 so as to freely rotate around the rotation axis A2 parallel with the rotation axis A1.

As shown in FIGS. 8A to 8E, while the first link 10 rotates in a 180° arc in the first rotational direction, the second link 11 rotates in a 360° arc in the second rotational direction to the first link 10. Namely, the first link 10 relatively rotates in a 360° arc in the first rotational direction with respect to the second link 11. As mentioned above, the second solar gear 36 is fixed to the first link 10, so that when the first link 10 rotates in a 360° arc in the first rotational direction with respect to the second link 11, the second solar gear 36 also rotates in a 360° arc in the first rotational direction with respect to the second link 11, i.e., the second link body 39.

Since the timing belt 38 is wound round the second solar gear 36 and the second planet gear 37, the second planet gear 37 also rotates in the first rotational direction. The holding means 12 is fixedly connected to the second planet gear 37 and rotates together with the second planet gear 37. Since the number of teeth of the second solar gear 36 is ½ of the number of teeth of the second planet gear 37, the rotational angle of the holding means 12 is ½ of the rotational angle of the second solar gear 36 and when the first link 10 rotates in a 180° arc, the holding means also rotates in a 180° arc.

When the first link 10 is rotated in a θ arc in the first rotational direction by the servo motor M7 of the rotation connection 8 shown in FIG. 10, the second link 11 rotates in a 2θ arc in the second rotational direction and the holding means 12 rotates in a θ arc in the first rotational direction. When the first link 10, the second link 11, and the holding means 12 rotate in link motion with each other like this, the workpiece W can be transferred with a fixed direction.

Although the transfer device 35 is structured so as to be folded outside the robot 3 as shown in FIGS. 8A to 8E, it may be structured so as to be folded inside the robot 3 as shown in FIGS. 12A to 12E.

Figure 13:
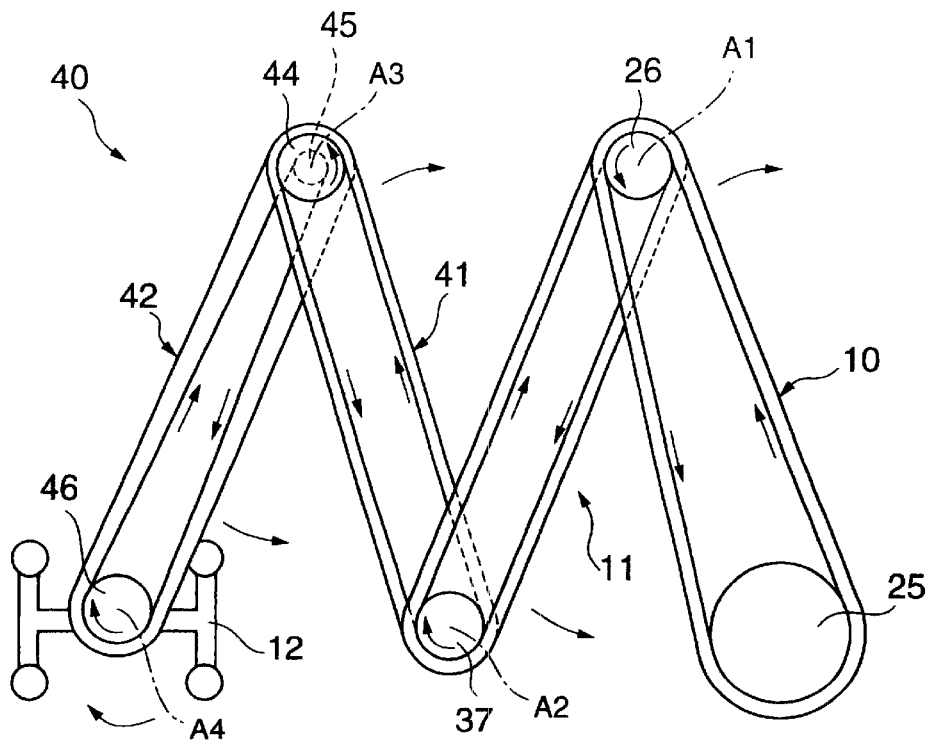
FIG. 13 is a plan view showing the internal mechanism of the transfer device 40.
Figure 14:
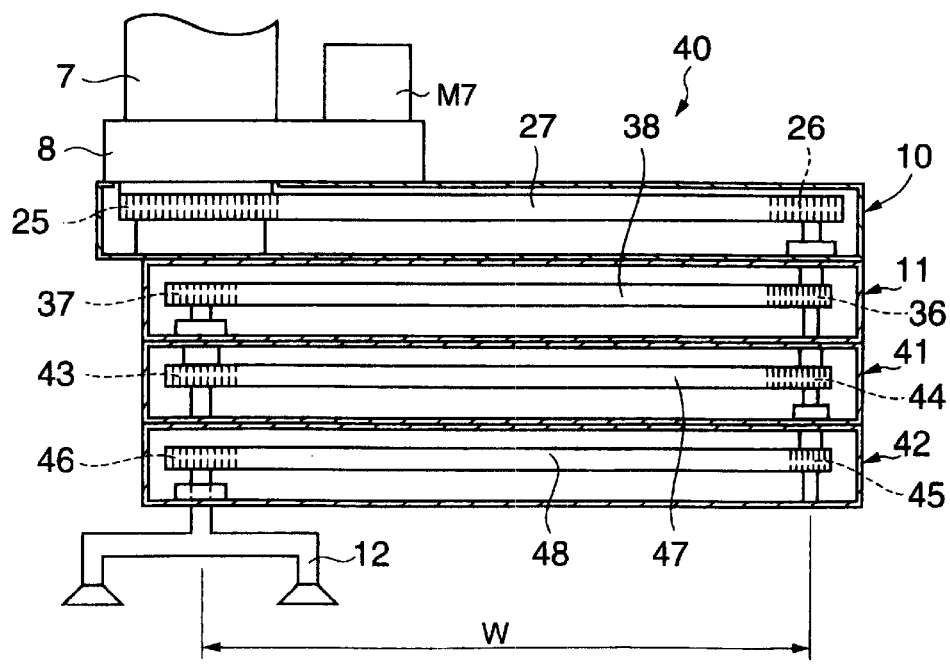
FIG. 14 is a side view showing the internal mechanism of the transfer device 40.

FIG. 13 is a plan view showing the internal mechanism of the transfer device 40 of still another embodiment of the present invention and FIG. 14 is a side view thereof. The transfer device 40 of this embodiment is characterized in that a third link 41 and a fourth link 42 are installed in addition to the first and second links 10 and 11. The first to fourth links 10, 11, 41, and 42 have the same length W respectively.

The proximal end of the third link 41 is connected to the distal end of the second link 11 so as to freely rotate around the rotation axis A2, and the proximal end of the fourth link 42 is connected to the distal end of the third link 41 so as to freely rotate around a rotation axis A3 parallel with the rotation axis A2, and the holding means 12 is connected to the distal end of the fourth link 42 so as to freely rotate around a rotation axis A4 parallel with the rotation axis A3, and they are connected in an almost M shape as shown in FIG. 13.

The third and fourth links 41 and 42, in the same way as with the first and second links 10 and 11, have third and fourth solar gears 43 and 45, third and fourth planet gears 44 and 46, and timing belts 47 and 48 wound round them inside and the second, third, and fourth links 11, 41, and 42 and the holding means 12 rotate in link motion with the rotation of the first link 10.

To transfer the workpiece W, the first to fourth links 10, 11, 41, and 42 are extended toward the pressing machine 20 on one side in a straight line, and the holding means 12 holds the workpiece W, and the first link 10 is rotated in the first rotational direction (clockwise in FIG. 13). Then, in link motion with it, the second link 11 rotates in the second rotational direction (counterclockwise), and the third link 41 rotates in the first rotational direction (clockwise) in link motion with it, and the fourth link 42 rotates in the second rotational direction (counterclockwise) in link motion with it, and the holding means 12 rotates in the first rotational direction (counterclockwise) in link motion with it. In this way, the transfer device 40 is contracted, and the transfer device 40 is fully folded at the center of the pair of the pressing machines 21 and 21. When the first link 10 is further rotated in the first direction, the first to fourth links 10, 11, 41, and 42 are extended toward the other side in a straight line and the workpiece W can be transferred to the other pressing machine 21. In this way, the workpiece W can be transferred free of inversion.

The length of the transfer device 40 when it is folded is W, while the length of the transfer device when it is extended is 4W and the transfer device 40 itself can transfer the workpiece W at a distance of 8W from one side to the other side. In the transfer device 40 shown in FIGS. 13 and 14, the transfer device 40 is M-shaped and folded outside the upper arm 6 of the robot 3. However, it may be W-shaped inversely and folded inside the upper arm 6.

Figure 15:
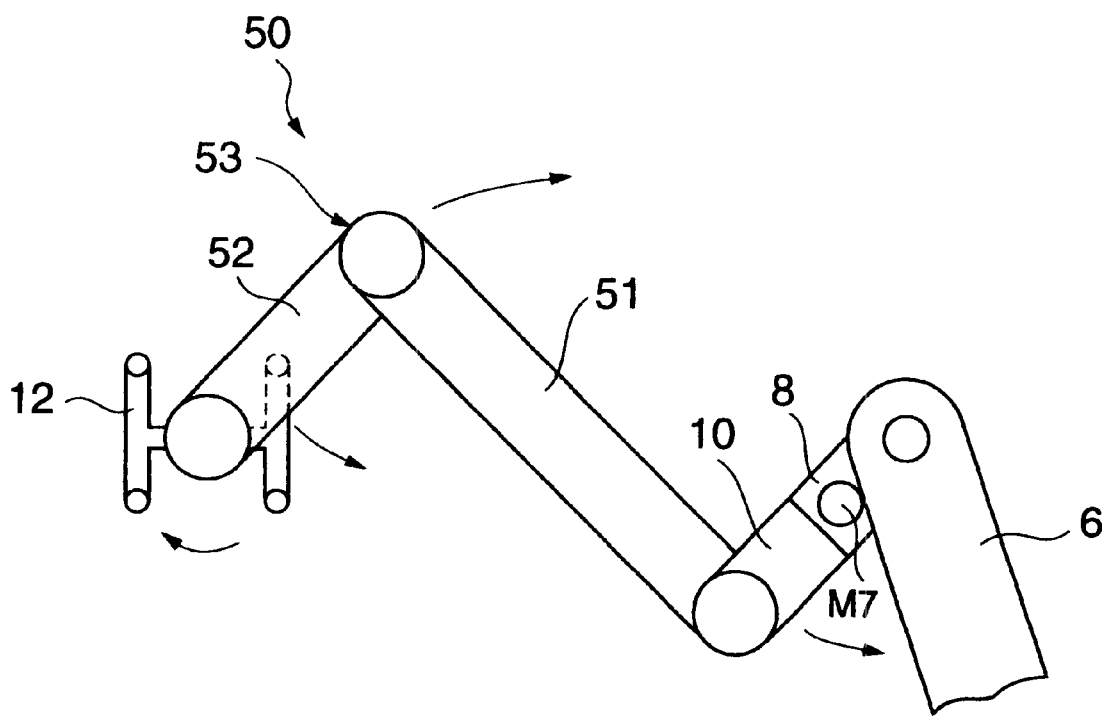
FIG. 15 is a plan view showing the constitution of the transfer device 50.

FIG. 15 is a plan view showing the constitution of the transfer device 50 of a further embodiment of the present invention. A link mechanism 53 of the transfer device 50 has the first to third links 10, 51, and 52 and the lengths of the first and third links 10 and 52 are W, while the length of the second link 51 is 2W. The proximal end of the second link 51 is attached to the distal end of the first link 10 so as to rotate, and the proximal end of the third link 52 is attached to the distal end of the second link 51 so as to rotate, and the holding means 12 is attached to the distal end of the third link 52 so as to rotate. The first to third links 10, 51, and 52 and the holding means 12 also rotate in link motion with the rotation of the first link 10 in the same way as is true with the aforementioned.

Therefore, the first to third links 10, 51, and 52 are extended toward one side in a straight line, and the first link 10 is rotated in the first rotational direction with the workpiece W, and the transfer device 50 is folded. The first link 10 is further rotated in the first rotational direction, and the transfer device 50 is extended to the other side, thereby the workpiece W can be transferred free of inversion. In the transfer device 50, the length of the second link 51 is set to 2W, thereby only the three links 10, 51, and 52 can transfer the workpiece W at the same distance 8W as that of the M-shaped transfer device mentioned above. The first link 10 may be rotated inside the upper arm 6 of the robot 3 instead of outside.

In each embodiment aforementioned, the robot system is structured so as to transmit the rotation of the first link 10 to the other links and the holding means by the timing belts and gears. However, the robot system is not limited to this method and for example, it may be structured so as to transmit the rotation by a chain, a sprocket wheel, or a gear train.

Figure 16:
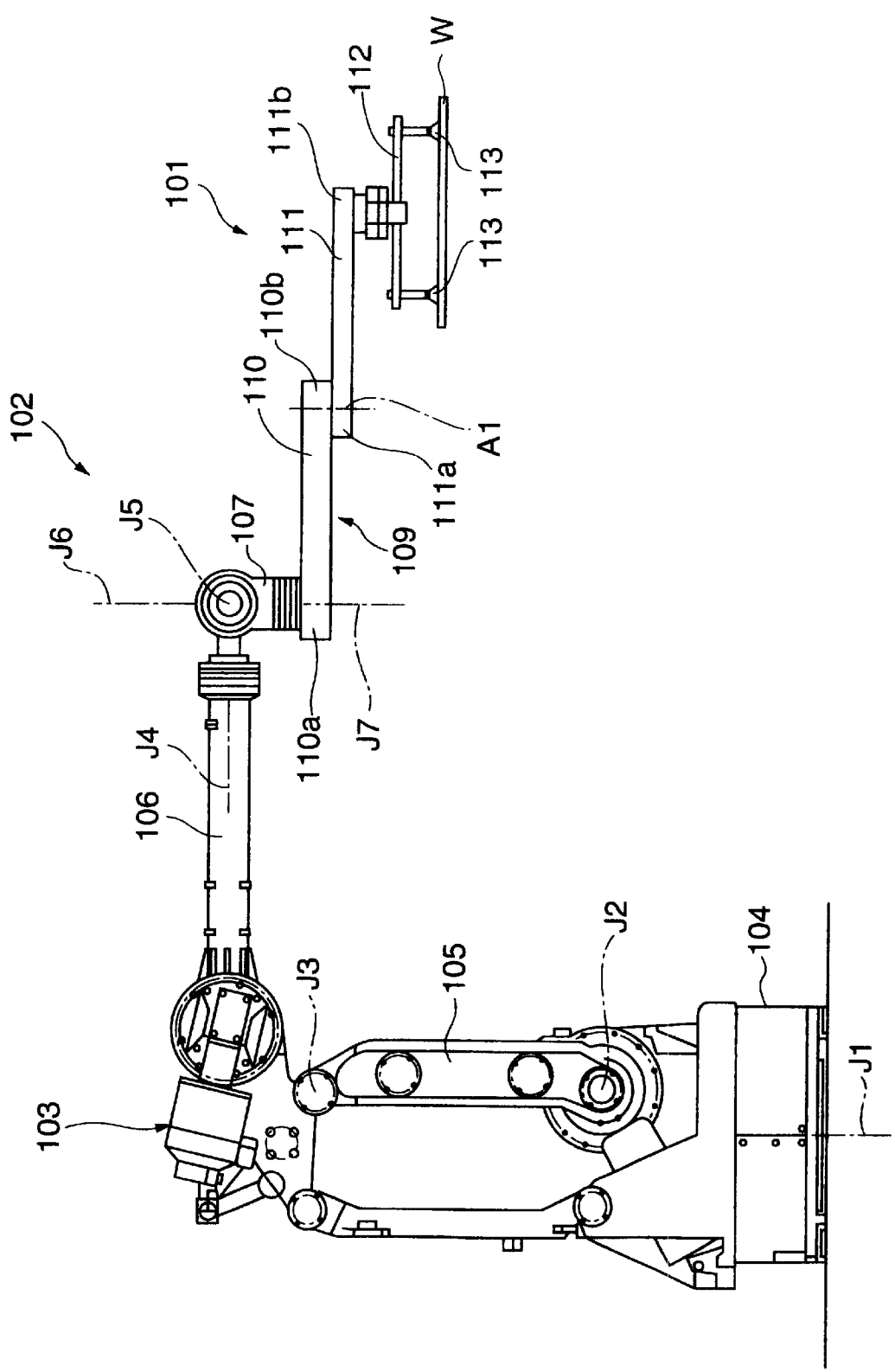
FIG. 16 is a side view showing the robot system 102 using the transfer device 101 which is an embodiment of the present invention.
Figure 17:
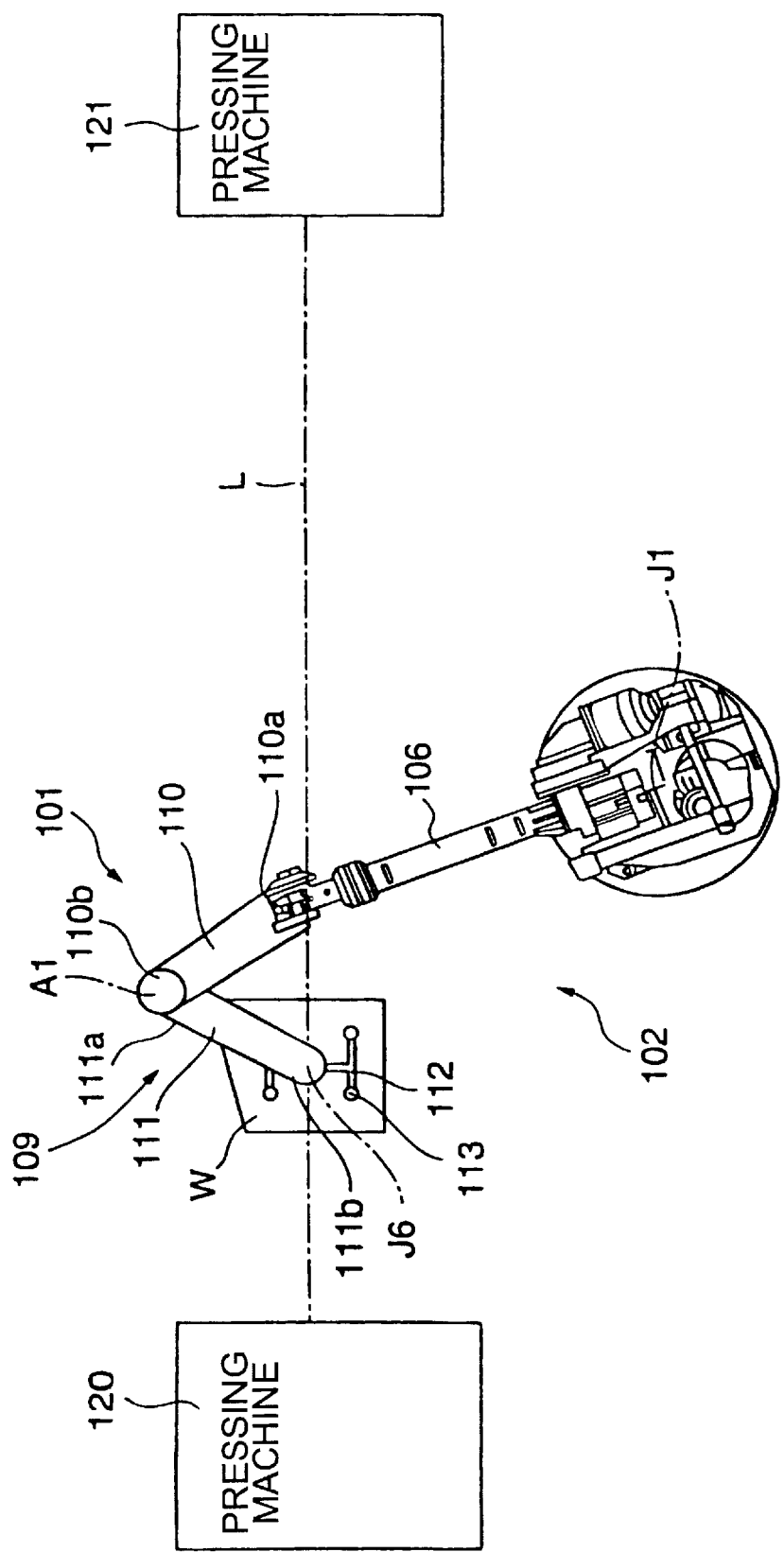
FIG. 17 is a plan view of the robot system 102.

FIG. 16 is a side view showing a robot system 102 having a transfer device 101 of another embodiment of the present invention and FIG. 17 is a plan view thereof. The transfer device 101 is disposed at a wrist 107 of a robot 103 and used to transfer the workpiece W between a pair of pressing machines 120 and 121.

The robot 103 is a 6-axis multi-joint robot and has a base 104 to be fixed to the floor, a lower arm 105, an upper arm 106, and the wrist 107. The lower arm 105 having a vertical lower end is attached to the base 104 so as to rotate around a first axis J1 and installed on the base 104 so as to rotate in back-and-forth direction around a horizontal second axis J2. At the upper end of the lower arm 105, the proximal end of the upper arm 106 is attached so as to rotate vertically around a horizontal third axis J3. The wrist 107 is disposed at the distal end of the upper arm 106 so as to rotate around a fourth axis J4 parallel with the axis of the upper arm 106 and also to rotate around a fifth axis J5 perpendicular to the axis of the upper arm 106. The transfer device 101 is attached to the wrist 107. The wrist 107 rotates around a sixth axis J6 perpendicular to the fifth axis J5.

The joint axes J1 to J6 of the robot 103 are individually driven to rotate by servo motors and the wrist 107 drives a first link 110 to rotate around the sixth axis J6 with respect to the upper arm 106.

The transfer device 101 is composed of a link mechanism 109 having the first link 110 and a second link 111 and holding means 112 installed at the distal end of the second link 111. The second link 111 has the same length as that of the first link 110, and a proximal end 111a is attached at a distal end 110b of the first link 110 so as to rotate around a rotation axis A1 parallel with the sixth axis J6, and the holding means 112 is attached at a distal end 111b of the second link 111. The holding means 112 has a plurality of suction pads 113 and holds the workpiece W with these suction pads 113 in a removable state.

The robot 103 of the robot system 102 is installed at the center of the two pressing machines 120 and 121 and the workpiece W is transferred from the pressing machine 120 on one side at the first position on the left of FIG. 17 to the pressing machine 121 on the other side at the second position on the right of FIG. 17. The robot 103 holds the transfer device 101 almost horizontally so that the sixth axis J6 is set vertically, swings the upper arm 106 around the first axis J1, and reciprocates the link mechanism 109 of the transfer device 101 synchronously with the swing of the upper arm 106.

Next, the transfer operation of the robot system 102 will be explained more in detail by referring to FIGS. 18A to 18E.

Figures 18A, 18B:
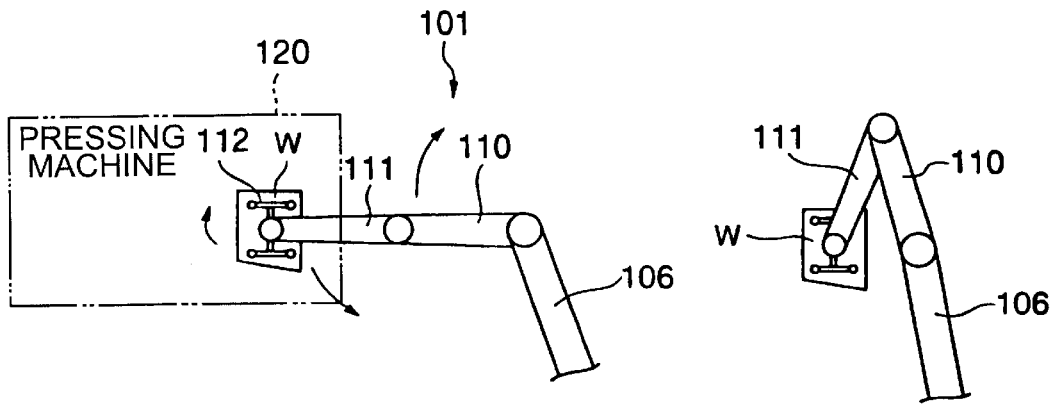
FIGS. 18A to 18E are drawings showing the transfer process by the transfer device 101.

As shown in FIG. 18A, the robot 103 extends the transfer device 101 toward the pressing machine 120 on one side together with the upper arm 106 and holds the workpiece W with the holding means 112. Then the first link 110 rotates in the first rotational direction (clockwise in FIG. 18A), and the second link 111 rotates in the second rotational direction (counterclockwise in FIG. 18A), and the holding means 112 rotates in the first rotational direction (clockwise in FIG. 18A). By this rotation, the workpiece W moves while keeping its original direction.

Figures 18C, 18D:
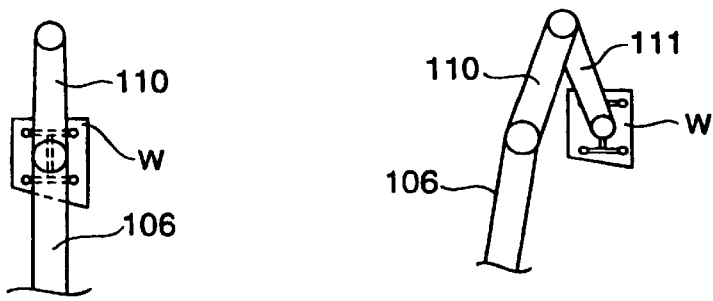

When the first link 110 is further rotated in the first direction, via the state shown in FIG. 18B, the transfer device 101 is folded at the center between the pressing machines 120 and 121 as shown in FIG. 18C. At this time, the upper arm 106 of the robot 103 is arranged perpendicularly to the transfer route L and the first link 110 and the second link 111 are folded and arranged perpendicularly to the transfer route L.

Figure 18E:
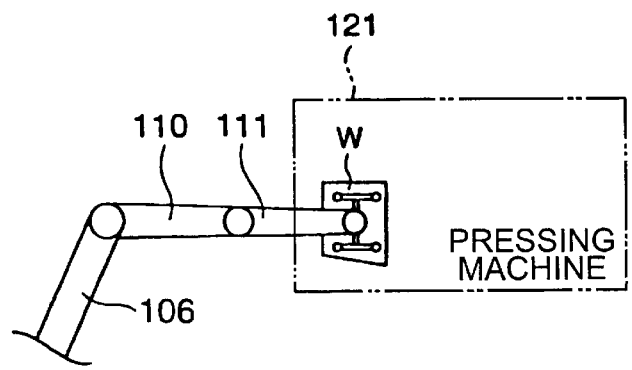

When the upper arm 106 is further swung toward the other side and the first link 110 is rotated in the first rotational direction, the transfer device 101 is extended toward the other side with the workpiece W kept in the same direction. By doing this, via the state shown in FIG. 18D, the first link 110 and the second link 111 are extended until they are arranged in a straight line and the workpiece W is transferred to the pressing machine 121 on the other side. As shown in FIG. 18E, the direction of the workpiece W after transfer completion is the same direction as that of the workpiece W at the time of transfer start shown in FIG. 18A.

Figure 19:
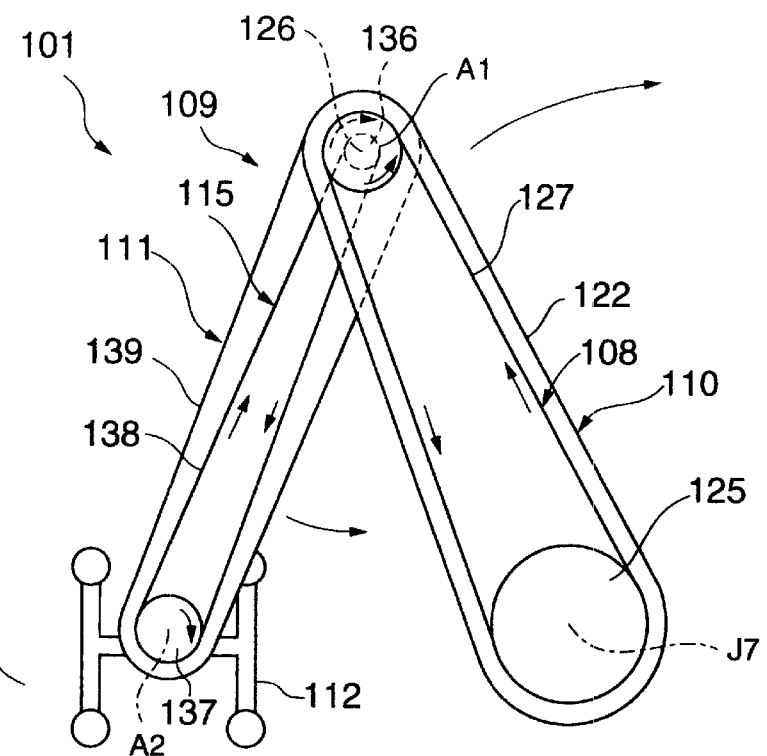
FIG. 19 is a plan view showing the internal mechanism of the transfer device 101.
Figure 20:
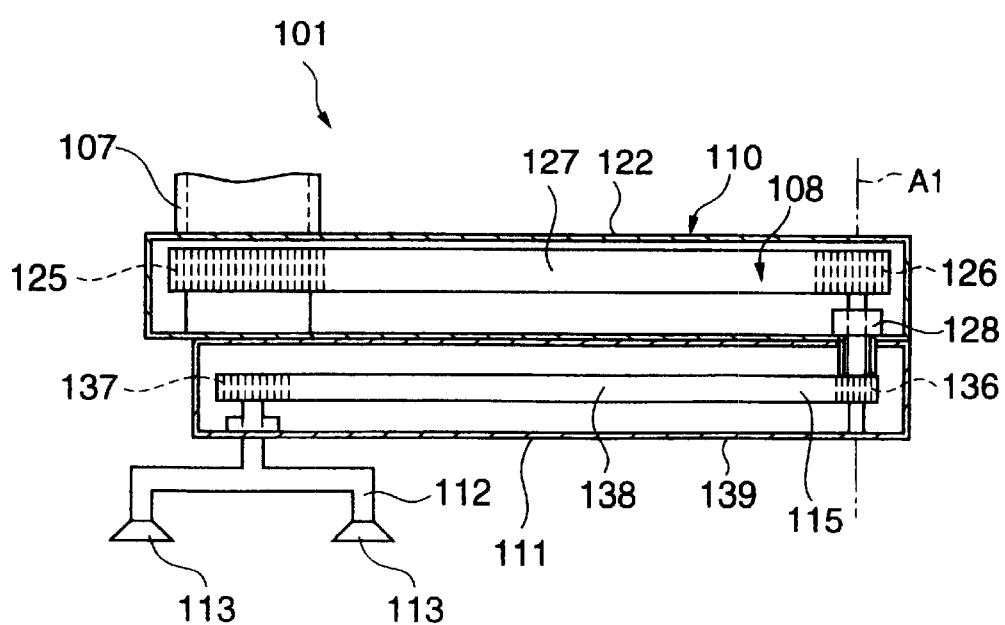
FIG. 20 is a side view showing the internal mechanism of the transfer device 101.

Next, the link mechanism 109 will be explained. FIG. 19 is a plan view showing the internal structure of the transfer device 101 and FIG. 20 is a side view thereof. The link mechanism 109 includes the first link 110, the second link 111, rotation transmitting means 108 for transmitting the rotation of the first link 110 with respect to the upper arm 106 of the robot to the second link 111 and rotating the second link 111 with respect to the first link 110, and rotation transmitting means 115 for transmitting the rotation of the second link 111 with respect to the first link 110 to the holding means 112 and rotating the holding means 112.

The first link 110 has a follow first link body 122, and a proximal end 110a thereof is fixed to a wrist 107, and a first link body 122 is driven to rotate by a servo motor for driving the wrist 107 of the robot. A first solar gear 125 is installed on the side of the proximal end 110a in the first link body 122. The first solar gear 125 is fixedly connected to the upper arm 106 of the robot and when the first link 110 is rotated by the wrist, the first solar gear 125 rotates relatively to the first link 110. At a distal end 110b of the first link body 122, a first planet gear 126, which is born so as to freely rotate around the rotation axis A1 parallel with the sixth axis J6, is installed and a timing belt 127 is wound between the first solar gear 125 and the first planet gear 126. The rotation transmitting means 108 is composed of the first solar gear 125, the first planet gear 126, and the timing belt 127. The first planet gear 126 is born to the first link body 122 by a bearing 128 so as to freely rotate, and is fixed to the proximal end 111a of the second link 111, and the second link 111 rotates together with the first planet gear 126.

A second solar gear 136 is installed at the proximal end of a hollow second link body 139, and a second planet gear 137 is installed at the distal end thereof, and the holding means 112 is connected to the second planet gear 137 and rotates together with the second planet gear 137. A timing belt 138 is wound round the second solar gear 136 and the second planet gear 137. The rotation transmitting means 115 is composed of the second solar gear 136, the second planet gear 137, and the timing belt 138.

Figure 21:
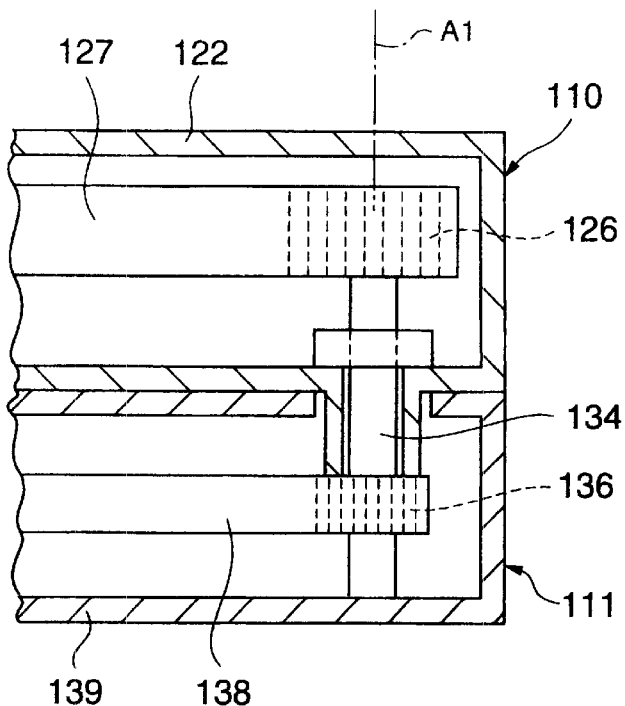
FIG. 21 is a cross sectional view showing the neighborhood of the first planetary gear 126 and the second solar gear 136 of the transfer device 135.

As shown in FIG. 21, the second solar gear 136 is fixedly connected to the first link body 122 and rotates together with the first link 110. The first planet gear 126 and the second solar gear 136 have the rotation axis A1 in common, and as shown in FIG. 21, the first planet gear 126 is fixedly connected to the second link body 139 via an axis 134 and rotates around the rotation axis A1 together with the second link 111. The second solar gear 136 is fixedly connected to the first link body 122 and integrated with the first link 110. The second planet gear 137 is born by the second link body 139 at the distal end 111a of the body of the second link 111 so as to freely rotate around the rotation axis A2 parallel with the rotation axis A1.

Since the timing belt 127 is wound round the first solar gear 125 and the first planet gear 126, as shown in FIG. 19, when the gear 125 is fixed and the first link 110 is rotated in the first rotational direction (clockwise in FIG. 19), the timing belt 127 rotates as shown by the arrows in FIG. 19, thereby the first planet gear 126 rotates in the second rotational direction (counterclockwise). As described above, the first planet gear 126 and the second link 111 are fixed and rotate together, so that, when the first link 110 is driven to rotate in the first rotational direction, the second link 111 can be rotated in the second rotational direction in link motion with the first planet gear 126.

As explained in FIG. 1, assuming the swing angle of the upper arm 106 from the center to the pressing machine 121 on the other side at the second position as $\alpha(°)$, when the wrist is controlled so that the rotational angle of the first link 110 driven by the wrist becomes $(90-\alpha)/\alpha$ times of the swing angle $\alpha$ of the upper arm 106 and the rotation transmitting means 108 is set so that the rotational angle of the second link 111 becomes $180/(90-\alpha)$ times of the rotational angle of the first link with respect to the upper arm 106, the holding means 112 installed at the distal end of the second link 111 can be moved linearly from the pressing machine 120 on one side to the pressing machine 121 on the other side.

To control the wrist so that the rotational angle of the first link 110 becomes $(90-\alpha)/\alpha$ times of the swing angle $\alpha$ of the upper arm 106 is that, for example, when the swing angle $\alpha$ of the arm 106 is 30°, the rotational angle of the first link 110 is controlled so as to be 2 times of the swing angle of the arm 106, and when the swing angle $\alpha$ is 45°, the rotational angle of the first link 110 is controlled so as to be equal to the swing angle of the arm 106, and when the swing angle $\alpha$ is 60°, the rotational angle of the first link 110 is controlled so as to be ½ of the swing angle of the arm 106.

To set the rotation transmitting means 108 so that the rotational angle of the second link 111 becomes $180/(90-\alpha)$ times of the rotational angle of the first link with respect to the upper arm 106 is that, for example, when the swing angle $\alpha$ of the arm 106 is 30°, the rotation transmitting means 108 is set so that the rotational angle of the second link 111 with respect to the first link 110 becomes 3 times of the swing angle, and when the swing angle $\alpha$ is 45°, the rotation transmitting means 108 is set so that the rotational angle of the second link 111 becomes 4 times of the swing angle, and when the swing angle $\alpha$ is 60°, the rotation transmitting means 108 is set so that the rotational angle of the second link 111 becomes 6 times of the swing angle.

Namely, the number of teeth of the first solar gear 125 is selected to be 180/(90−α) times of the number of teeth of the first planet gear 126 of the rotation transmitting means 108.

In the same way, as explained in FIG. 1, when the holding means rotation transmitting means 115 is set so that the rotational angle of the second link 111 with respect to the first link 110 is enlarged to ½ times and transferred to the holding means 112, an article to be transferred can be transferred free of inversion with the direction kept unchanged.

Namely, the number of teeth of the second solar gear 136 is selected to be ½ times of the number of teeth of the second planet gear 137 of the rotation transmitting means 115.

Although FIG. 1 shows only the state when a workpiece moves from the center to the second position, the movement from the first position to the center appears symmetrically.

Figure 22:
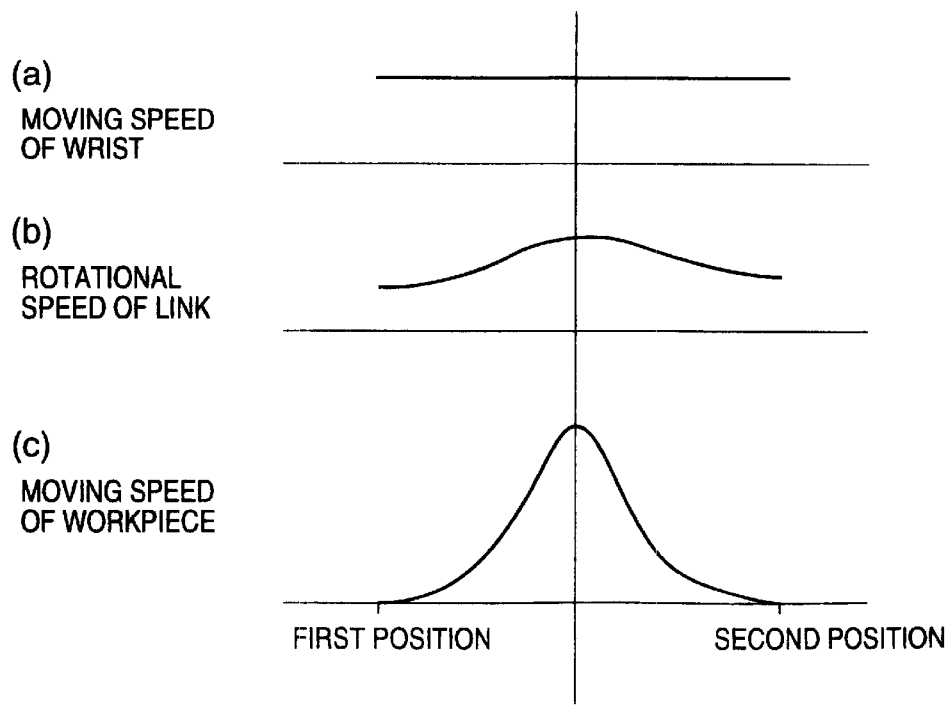
FIG. 22 is a graph showing the relationship between the arm moving speed (a) of a robot, the rotation angular speed (b) of the second link, and the workpiece moving speed (c).

FIG. 22 is a graph showing the relationship between the moving speed (a) of the wrist of the upper arm 106, the rotational speed (b) of the link, and the moving speed (c) of the workpiece W.

When the arm 106 swings from the first position to the second position, the first link 110 rotates in a 180° arc. The robot 103 is controlled so that the wrist of the upper arm 106 moves at a constant speed along the transfer route L. Therefore, as shown in FIG. 22(*a*), when the wrist moves at a constant speed, the rotational speed of the link is fastest at the center as shown in FIG. 22(*b*).

Therefore, the moving speed of the workpiece, as shown in FIG. 22(*c*), is much faster at the center than the moving speed of the arm 106.

With respect to the link mechanism 109, in the neighborhood of the first position and second position, the first link 110 and the second link 111 are open and the rigidity thereof is low, while at the center, the first link 110 and the second link 111 are folded and the rigidity thereof is high. Therefore, when the upper arm 106 moves at a constant speed, the moving speed is made slower in the neighborhood of the first position and second position where the rigidity of the link mechanism 109 is lower, and the moving speed is made faster at the center where the rigidity of the same is high, thereby the workpiece can be transferred stably.

Figure 23:
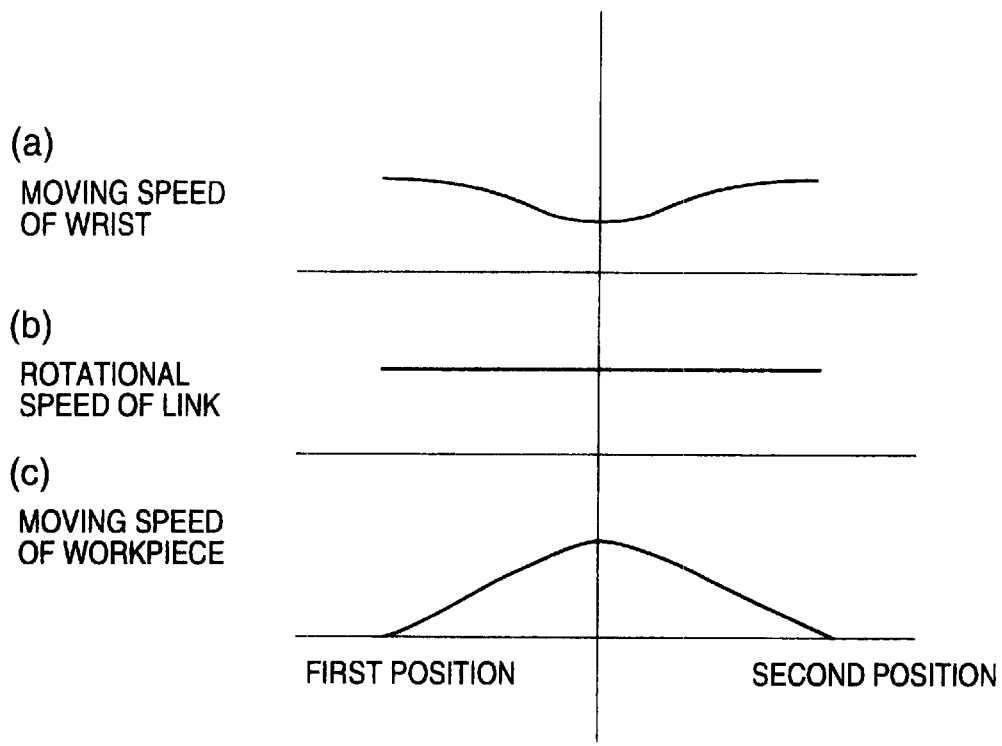
FIG. 23 is a graph showing the relationship between the arm moving speed (a) of a robot, the rotation angular speed (b) of the second link, and the workpiece moving speed (c).

Inversely, as shown in FIG. 23(*a*), at the center between the first position and the second position, the swing speed of the upper arm 106 is controlled so as to make the moving speed of the distal end of the upper arm 106 slower, thereby the rotational speed of the link is controlled so as to be made constant as shown in FIG. 23(*b*).

Figure 24:
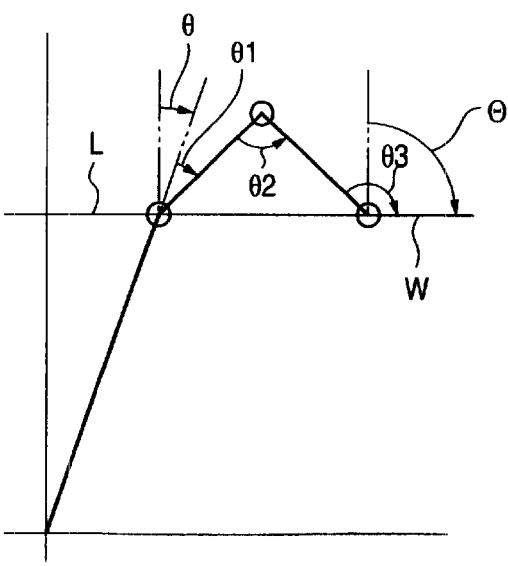
FIG. 24 is a drawing for explaining the horizontal posture angle of the workpiece W.

Next, the horizontal posture angle of the workpiece W will be explained by referring to FIG. 24.

Assuming the swing angle when the upper arm 106 of the robot 103 swings from the center to the second position as α, the swing angle of the arm 106 at an optional position as θ, the rotational angle of the first link 110 as θ1, the rotational angle of the second link 111 as θ2, and the rotational angle of the holding means 112 as θ3, the formulas are held:

$$\theta1=(90-\alpha)/\alpha \cdot \theta,$$

$$\theta2=180/(90-\alpha)\cdot\theta1=180/\alpha\cdot\theta.$$

and $$\theta3=90+½\cdot\theta2=90/\alpha\cdot\theta.$$

The horizontal posture angle Θ of the workpiece W is as shown below:

$$\Theta=\theta+\theta1-\theta2+\theta3=\theta+(90-\alpha)/\alpha\cdot\theta-180/\alpha\cdot\theta+90+90/\alpha\cdot\theta=90$$

and always constant.

Next, when the rotational angle θ1 of the first link 110 is rotated by a minute amount of ϕ, the following formulas are held:

$$\theta1=(90-\alpha)/\alpha\cdot\theta+\phi,$$

$$\theta2=180/(90-\alpha)\cdot\theta1=180/(90-\alpha)\cdot\{(90-\alpha)/\alpha\cdot\theta+\phi\}-180/\alpha\cdot\theta+180/(90-\alpha)\cdot\phi,$$

and $$\theta3=90+½\cdot\theta2=90+90/\alpha\cdot\theta+90/(90-\alpha)\cdot\phi$$

and the following formula is held:

$$\Theta=\theta+\theta1-\theta2+\theta3=$$

$$\theta+(90-\alpha)/\alpha\cdot\theta+\phi$$

$$-\{180/\alpha\cdot\theta+180/$$

$$(90-\alpha)\cdot\phi\}+$$

$$90+90/\alpha\cdot\theta+90/(90-\alpha)\cdot\phi=$$

$$90+\phi-180/(90-\alpha)\cdot\phi+90/$$

$$(90-\alpha)\cdot\phi=$$

$$90+\phi\cdot1/(90-\alpha)\cdot$$

$$(90-\alpha-180+90)=$$

$$90-\alpha/(90-\alpha)\cdot\phi$$

Therefore, the angle Θ is changed at a rotational angular ratio of α/(90−α) times to the minute amount ϕ. The changing ratio is decided by the system set angle a instead of the swing angle θ of the upper arm 106 of the robot 103 at that time.

Namely, changing of the posture of the workpiece holding means 112 by the minute amount ϕ can be carried out not only at the workpiece suction-holding point or the suction-holding release point at both ends but also at an intervening point, and at the time of attaching the workpiece holding means 112 to the transfer device 1, it can be adjusted finely.

Figure 25:
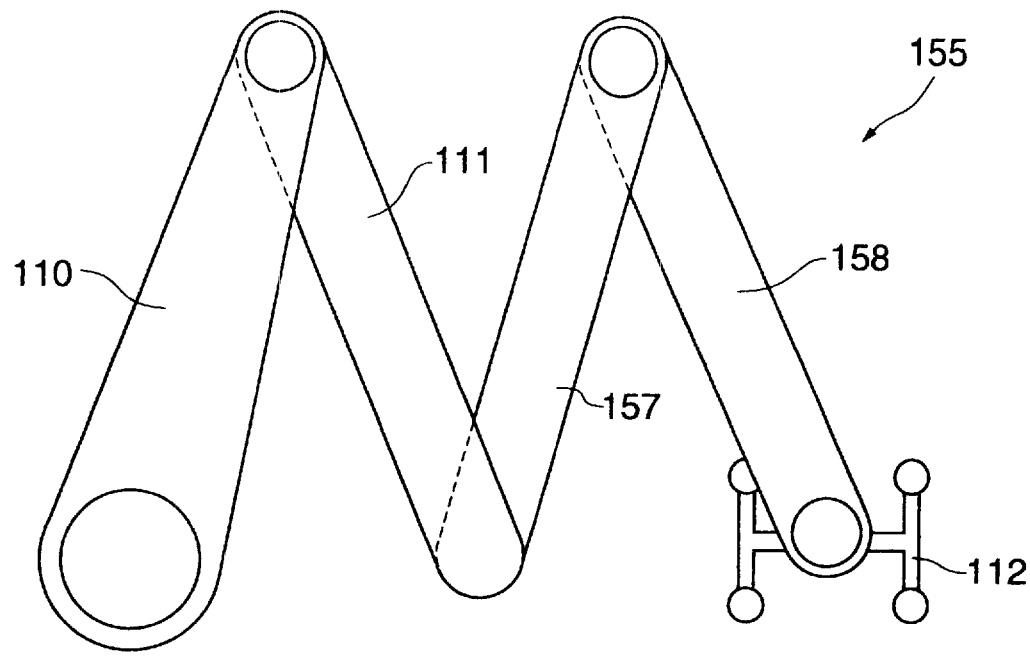
FIG. 25 is a plan view showing the transfer device 155 of another embodiment of the present invention.
Figure 26:
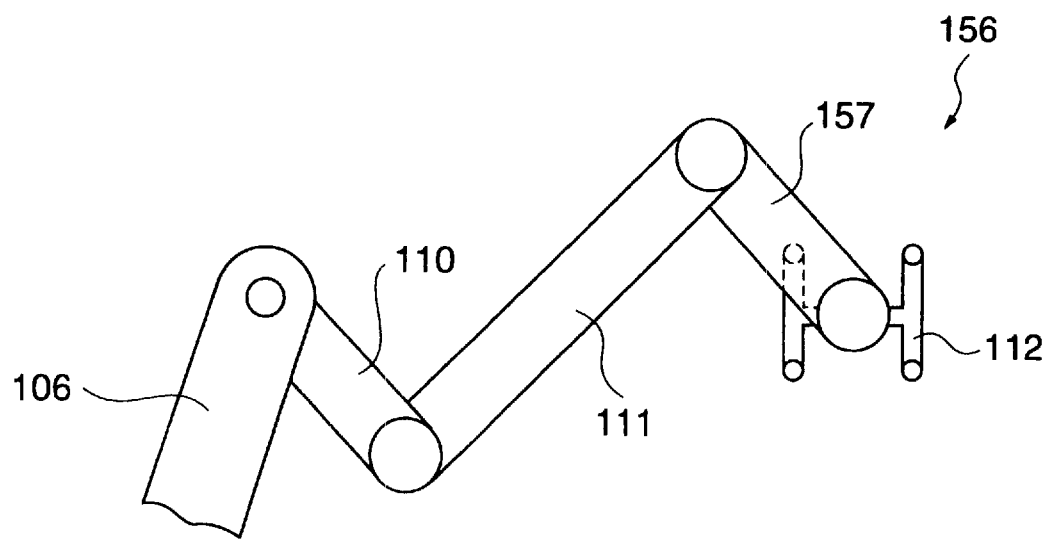
FIG. 26 is a plan view showing the transfer device 156 of still another embodiment of the present invention.

FIGS. 25 and 26 are plan views showing transfer devices 155 and 156 of another embodiment of the present invention. The transfer device 155 is one that the links of the link mechanism of the transfer device 101 mentioned above are connected in series and extended further. The transfer device 155 has an M-shaped structure, namely, a third link 157 is installed at the distal end of the second link 111 and a fourth link 158 is additionally installed at the distal end of the third link 157. By use of this constitution, the transfer distance can be extended to 2 times of that of the transfer device 101. To the third link 157 and the fourth link 158, the rotation of the first link 111 with respect to the upper arm 106 of the robot 103 is transmitted respectively by rotation transmitting means using a gear and a belt.

The transfer device 156 shown in FIG. 26 has a constitution that the length of the second link 111 is doubled and only the third link 157 is installed. By use of such a reverse N-shaped structure, the structure is simplified compared with the transfer device 155 shown in FIG. 25 and the transfer device 156 can be structured so as to have the same transfer distance as that of the transfer device 155.

The transfer operation of the transfer device of the robot system according to another embodiment of the present invention will be explained by referring to FIG. 27. An absolute coordinate system is set on the installation surface of the robot and the first position (on the left of FIG. 27) and the second position (on the right of FIG. 27) are set on the axis x of the absolute coordinate system. The arm of the robot reciprocates between the first position and the second position, and the link mechanism of the transfer device operates synchronously with this reciprocating motion. When the arm is positioned on the first position side, the link mechanism is extended toward the first position side, and when the arm is positioned on the second position side, the link mechanism is extended toward the second position side.

When the robot arm is positioned at the center between the first position and the second position, the robot wrist is positioned at the origin O and the arm angle when a workpiece is transferred to the second position is assumed as $\alpha(°)$. The first link and second link of the link mechanism are folded so as to be overlaid at the central position O, and the arm and link mechanism are extended linearly along the axis y. During transfer, the arm of the robot performs the swing operation so that the wrist moves linearly along the axis x. In this case, the axis x becomes a transfer route and to transfer an article to be transferred linearly along this transfer route, the holding means installed at the distal end of the second link must move along the axis x. For that purpose, firstly, it is necessary to control the rotation of the wrist so that, while the arm swings from 0° to $\alpha°$, the first link rotates in a $(90-\alpha)°$ arc with respect to the arm. Namely, the first link must rotate $(90-\alpha)/\alpha$ times of the swing angle of the arm.

Figure 27:
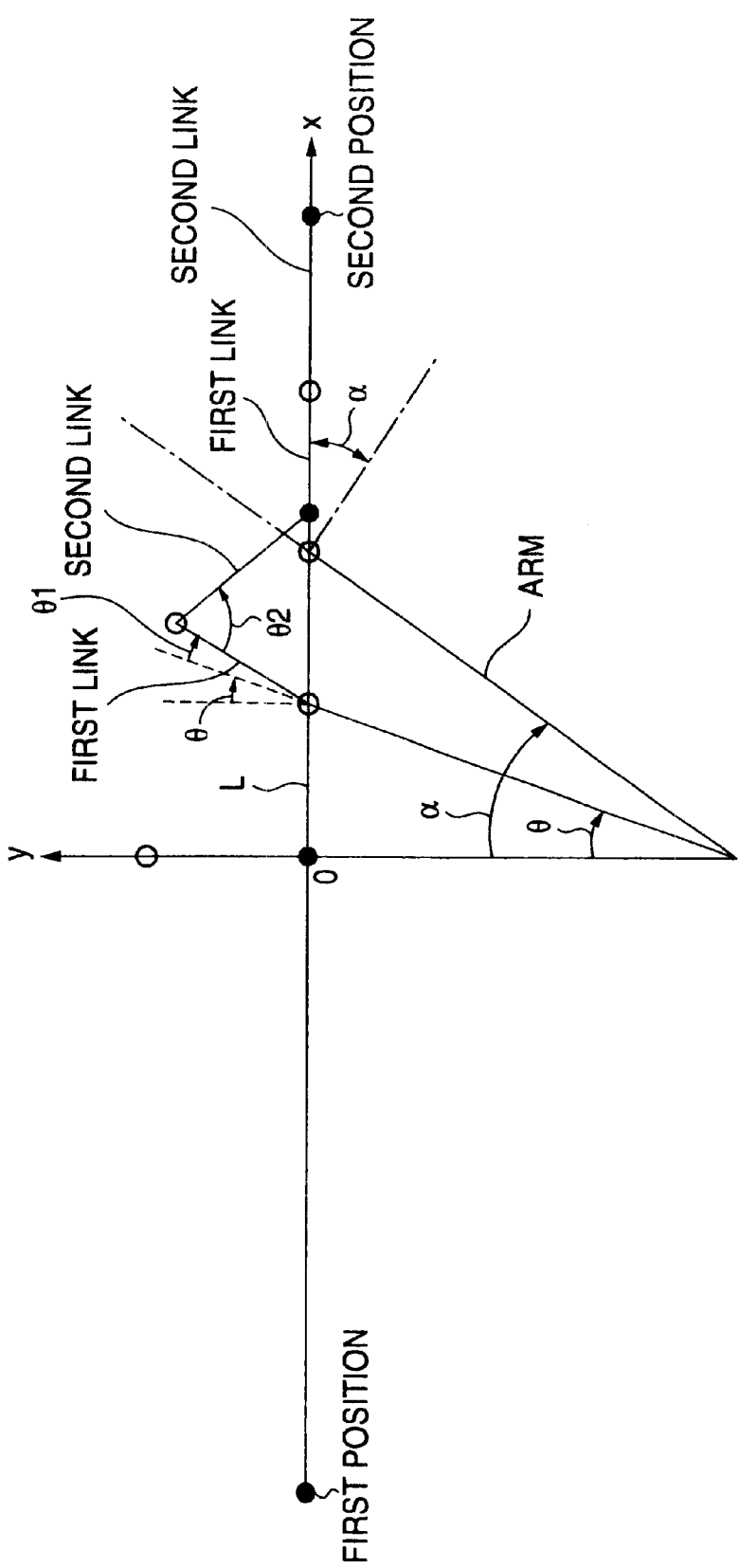
FIG. 27 is a drawing for explaining the operation of the transfer device of the present invention.

As shown in FIG. 27, the link mechanism must control the rotational angle of the second link with respect to the axis y in the absolute coordinate system so as to be always 2 times of the rotational angle of the first link with respect to the axis Here, assuming the swing angle of the arm with respect to the axis y in the absolute coordinate system at an optional position as $\theta(°)$, the rotational angle of the first link with respect to the arm as $\theta1(°)$, and the rotational angle of the second link with respect to the first link as $\theta2(°)$, the rotational angle of the first link with respect to the axis y becomes $(\theta+\theta1)$, so that when the rotation of the link mechanism is controlled so as to obtain the following formula:

$$\theta2=2(\theta+\theta1) \quad (1)$$

$\theta2/(\theta+\theta1)=2$ is obtained. Namely, the rotational angle of the second link becomes 2 times of the rotational angle of the first link. When the link rotation means is set so as to meet Formula (1) mentioned above, the workpiece W can be transferred linearly along the axis x.

When the link mechanism is controlled so as to not only rotate the first link by the wrist but also transmit the rotation of the wrist to the second link and rotate it using, for example, a gear, if the transfer distance is changed, the gear must be also changed. However, according to the present invention, link rotation means is installed and the rotation of the links is controlled separately, so that the system can easily respond to changing in the transfer distance.

Figure 28:
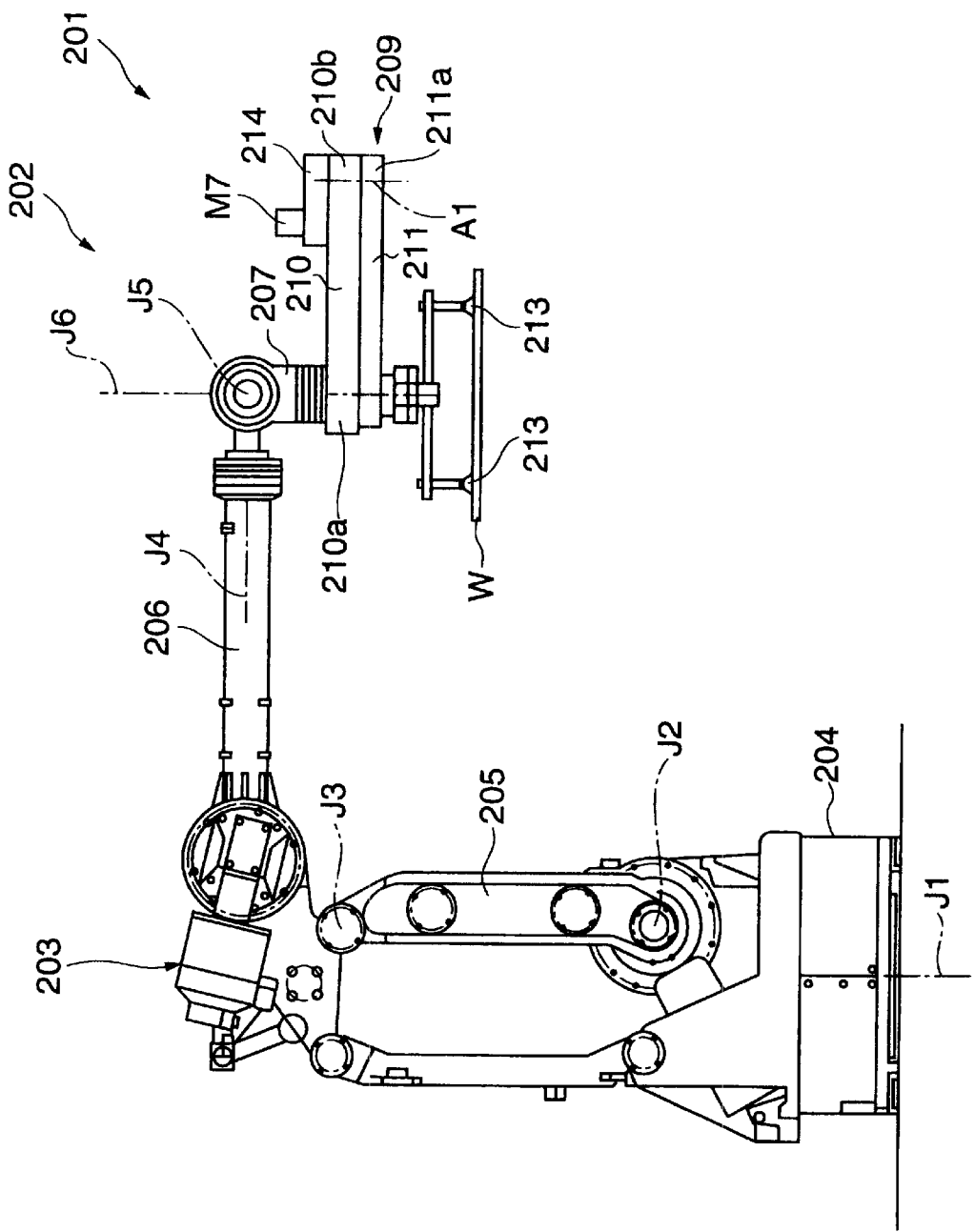
FIG. 28 is a side view showing the robot system 202 using the transfer device 201 which is an embodiment of the present invention.
Figure 29:
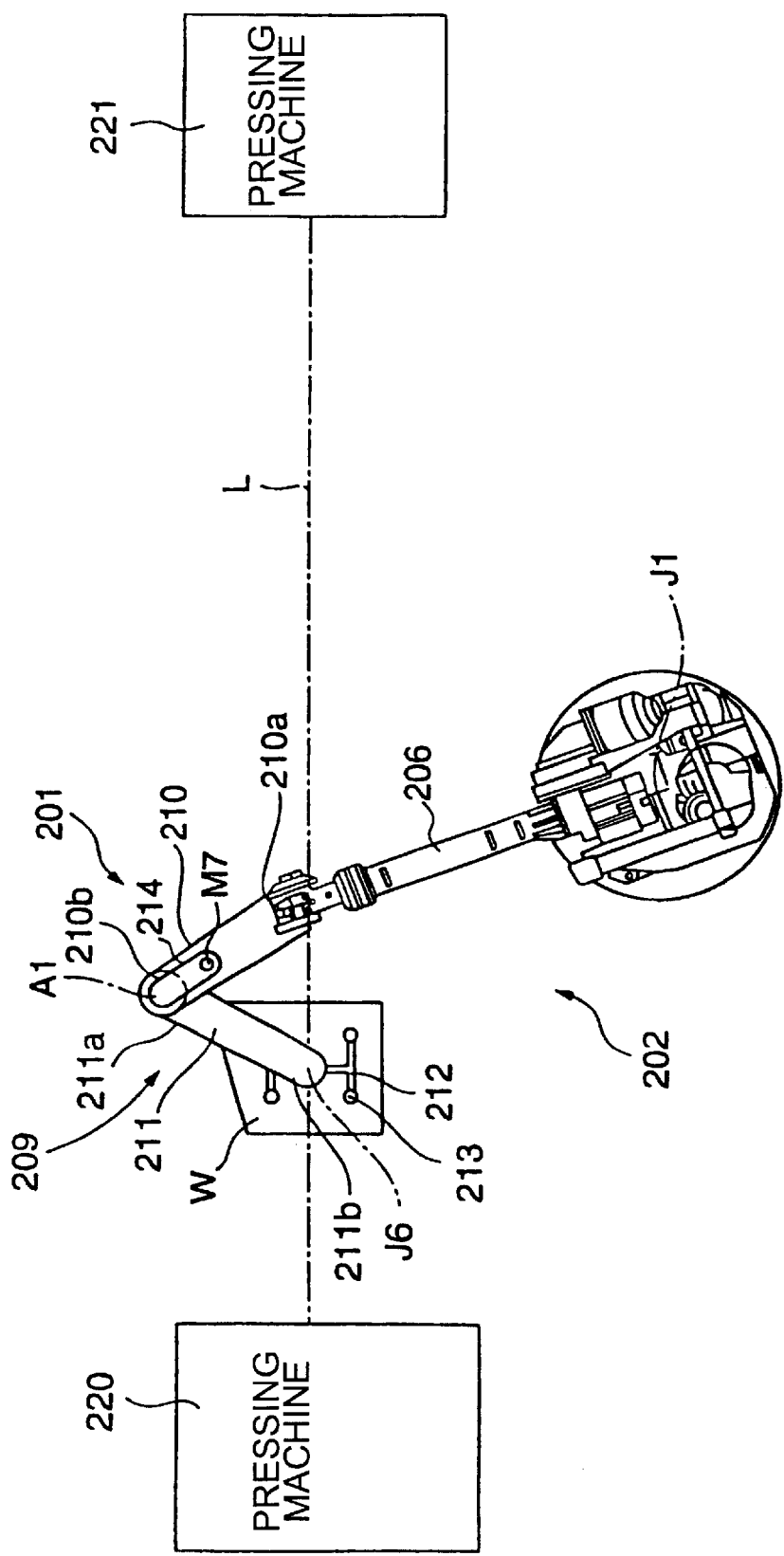
FIG. 29 is a plan view of the robot system 202.

FIG. 28 is a side view showing the robot system 202 whose operation is explained by referring to FIG. 27 and FIG. 29 is a plan view thereof. A transfer device 201 is disposed at a wrist 207 of a robot 203 and used to transfer the workpiece W between a pair of pressing machines 220 and 221 at the first and second positions.

The robot 203 is a 6-axis multi-joint robot and has a base 204 to be fixed to the floor, a lower arm 205, an upper arm 206, and the wrist 207. The lower arm 205 having a vertical lower end is attached to the base 204 so as to rotate around a first axis J1 and installed on the base 204 so as to rotate in back-and-forth direction around a horizontal second axis J2. At the upper end of the lower arm 205, the proximal end of the upper arm 206 is attached so as to rotate vertically around a horizontal third axis J3. The wrist 207 is attached at the distal end of the upper arm 206 so as to rotate around a fourth axis J4 parallel with the axis of the upper arm 206 and also to rotate around a fifth axis J5 perpendicular to the axis of the upper arm 206. The transfer device 201 is attached to the wrist 207. The wrist 207 rotates around a sixth axis J6 perpendicular to the fifth axis J6.

The joint axes J1 to J6 of the robot 203 are individually driven to rotate by servo motors and the wrist drives a first link 210 to rotate around the sixth axis J6 with respect to the upper arm 206.

The transfer device 201 is composed of a link mechanism 209 having the first link 210 and a second link 211, link rotation means 214 for rotating the link mechanism 209, and holding means 212 installed at the distal end of the second link 211. The second link 211 has the same length as that of the first line 210, and a proximal end 211a is attached at a distal end 210b of the first link 210 so as to rotate around a rotation axis A1 parallel with the sixth axis J6, and the holding means 212 is attached at a distal end 211b of the second link 211. The holding means 212 has a plurality of suction pads 213 and holds the workpiece W with these suction pads 213 in a removable state.

The robot 203 of the robot system 202 is installed at the center of the two pressing machines 220 and 221 and the workpiece W is transferred from the pressing machine 220 on one side at the first position on the left of FIG. 29 to the pressing machine 221 on the other side at the second position on the right of FIG. 29. The robot 203 holds the transfer device 201 almost horizontally so that the sixth axis J6 is set vertically, moves the upper arm 206 reciprocally around the first axis J1, and moves the link mechanism 209 of the transfer device 201 synchronously with the reciprocating motion of the upper arm 206.

Next, the transfer operation of the robot system 202 will be explained more in detail by referring to FIGS. 30A to 30E.

Figures 30A, 30B:
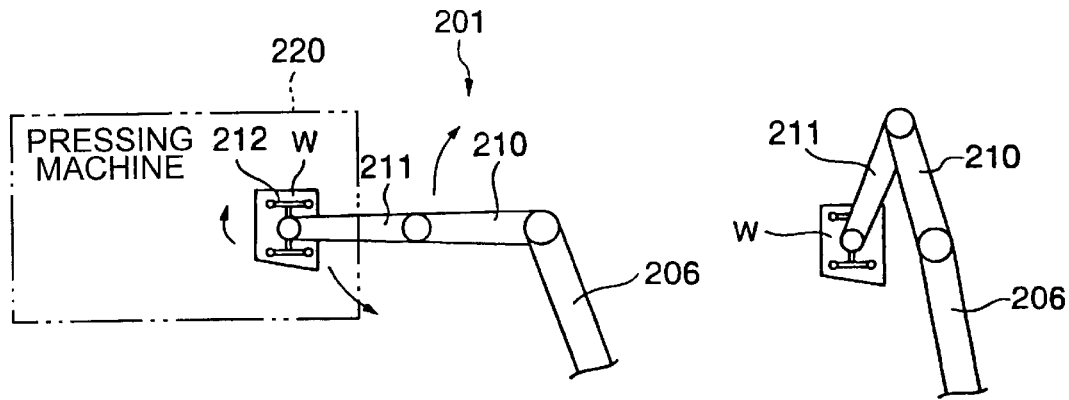
FIGS. 30A to 30E are drawings showing the transfer process by the transfer device 201.

As shown in FIG. 30A, the robot 203 extends the transfer device 201 toward the pressing machine 220 on one side together with the upper arm 206 and holds the workpiece W with the holding means 212. Then, the first link 210 rotates in the first rotational direction (clockwise in FIG. 30A), and the second link 211 rotates in the second rotational direction (counterclockwise in FIG. 30A), and the holding means 212 rotates in the first rotational direction (clockwise in FIG. 30A). By this rotation, the workpiece W moves while keeping the original direction.

Figures 30C, 30D:
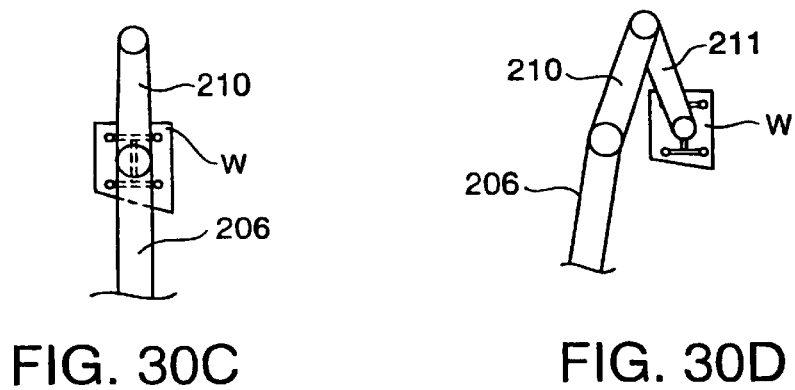

When the first link 210 is further rotated in the first direction, via the state shown in FIG. 30B, the transfer device 201 is folded at the center between the pressing machines 220 and 221 as shown in FIG. 30C. At this time, the upper arm 206 of the robot 203 is arranged perpendicularly to the transfer route L and the first link 210 and the second link 211 are folded and arranged perpendicularly to the transfer route L.

Figure 30E:
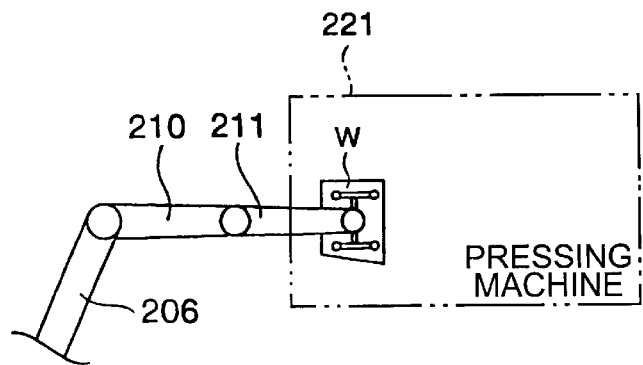

When the upper arm 206 is further swung toward the other side and the first link 210 is further rotated in the first rotational direction, the transfer device 201 is extended toward the other side with the workpiece W kept in the same direction. By doing this, via the state shown in FIG. 30D, the first link 210 and the second link 211 are extended until they are arranged in a straight line and the workpiece W is transferred to the pressing machine 221 on the other side. As shown in FIG. 30E, the direction of the workpiece W after transfer completion is the same direction as that of the workpiece W at the time of transfer start shown in FIG. 30A.

Figure 31:
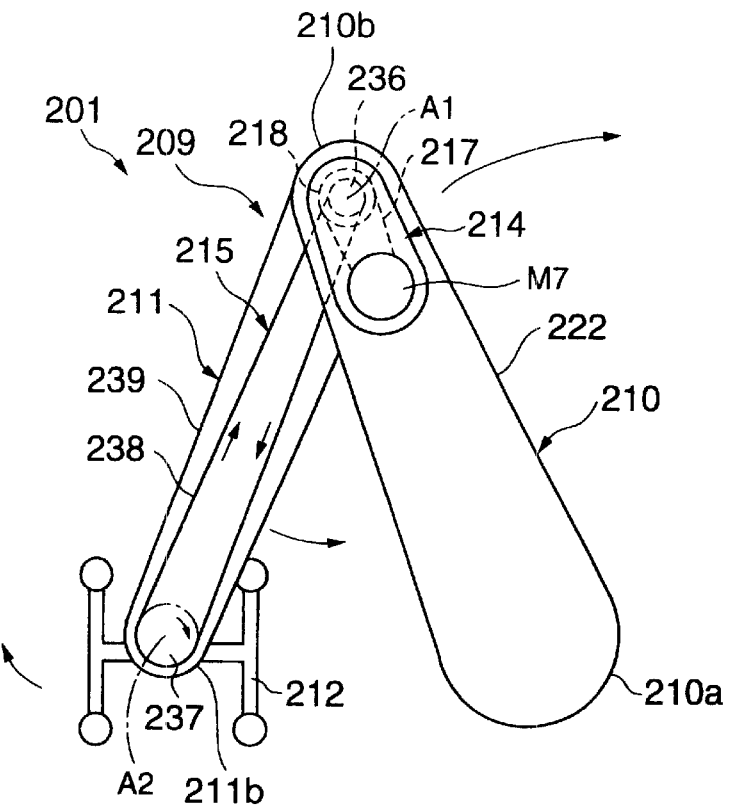
FIG. 31 is a plan view showing the internal mechanism of the transfer device 201.
Figure 32:
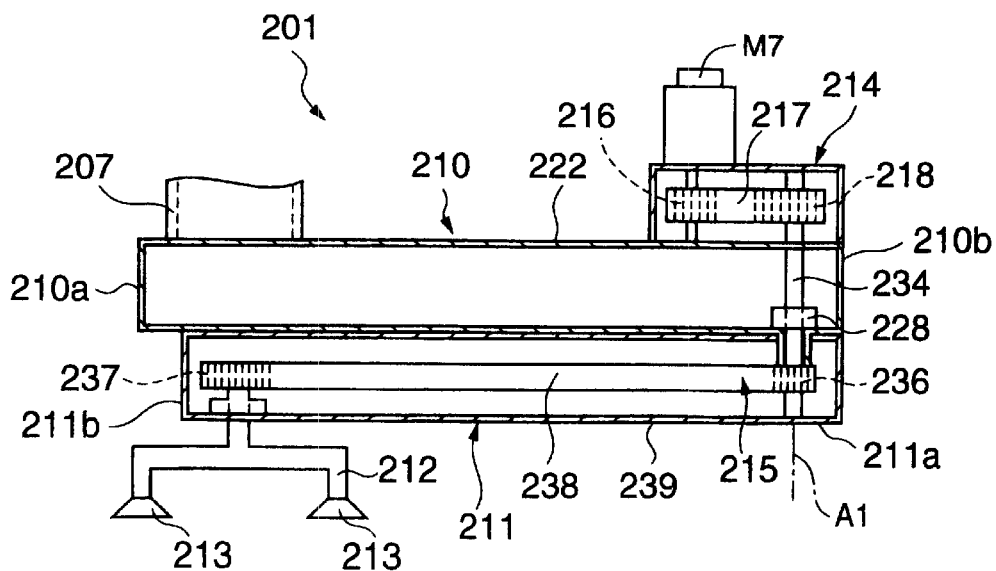
FIG. 32 is a side view showing the internal mechanism of the transfer device 201.

Next, the link mechanism 209 will be explained. FIG. 31 is a plan view showing the internal structure of the transfer device 201 and FIG. 32 is a side view thereof. The link mechanism 209 includes the first link 210, second link 211, link rotation means 214 for rotating the second link 211 with respect to the first link 210, and rotation transmitting means 215 for transmitting the rotation of the second link 211 with respect to the first link 210 to the holding means 212 and rotating the holding means 212.

The first link 210 has a hollow first link body 222. A proximal end 210a thereof is fixed to a wrist 207. The first link body 222 is driven to rotate by a servo motor for driving the wrist 207 of the robot. The link rotation means 214 having a servo motor M7 is installed on the upper part of the distal end 210b of the first link body 222. At a distal end 210b of the first link body 222, a rotation axis 234 is born so as to freely rotate around the rotation axis A1 parallel with the sixth axis J6. The upper end of the rotation axis 234 is projected from the upper part of the first link body 222 and a gear 218 is fixed to the upper end. A gear 216 is fixed to the end of the rotation axis of the servo motor M7 and a timing belt 217 is wound round the gear 216 and the gear 218 of the rotation axis 234. By use of this structure, when the servo motor M7 is driven, the rotation axis 234 can be driven to rotate around the axis A1.

The rotation axis 234 is born to the first link body 222 by a bearing 228 so as to freely rotate and fixed to a proximal end 211a of the second link 211. Therefore, when the rotation axis 234 rotates, the second link 211 is rotated.

A solar gear 236 is installed at the proximal end of a hollow second link body 239, and a planet gear 237 is installed at distal the end thereof. The holding means 212 is connected to the planet gear 237 and rotates together with the planet gear 237. A timing belt 238 is wound round the solar gear 236 and the planet gear 237 and the rotation transmitting means 215 is composed of the solar gear 236, the planet gear 237, and the timing belt 238.

As explained in FIG. 27, assuming the swing angle of the upper arm 206 from the center to the pressing machine 221 on the other side at the second position as α(°), the wrist is controlled so that the rotational angle of the first link 210 driven by the wrist becomes (90−α)/α times of the swing angle α of the upper arm 206. Further, assuming the swing angle of the upper arm 206 with respect to the axis y in the absolute coordinate system at an optional position as θ(°), the rotational angle of the first link 210 with respect to the upper arm 206 as θ1(°), and the rotational angle of the second link 211 with respect to the first link 210 as θ2(°), the rotational angle of the first link 211 with respect to the axis y becomes (θ+θ1), so that, when the rotation of the link mechanism is controlled so as to obtain the following formula:

$$\theta 2 = 2(\theta + \theta 1) \quad (1)$$

the rotational angle of the second link 211 becomes 2 times of the rotational angle of the first link 210. When the link rotation means 214 is controlled so as to meet Formula (1) mentioned above, the holding means 212 installed at the distal end 211b of the second link 211 can be moved from the pressing machine 220 on one side to the pressing machine 221 on the other side linearly along the transfer route L. At this time, the robot 203 moves the upper arm 206 so that the wrist 207 moves linearly along the transfer route L.

Further, when the rotation transmitting means 215 is set so that the rotational angle of the second link 211 with respect to the first link 210 is enlarged to ½ times and transferred to the holding means 212, an article to be transferred can be transferred free of inversion with the direction kept unchanged. Namely, the number of teeth of the solar gear 236 is selected to be ½ times of the number of teeth of the planet gear 237 of the rotation transmitting means 215.

Further, when the transfer distance, i.e., the distance between the first position and the second position is changed, the system can easily respond to the change by changing the swing angle α of the upper arm 206.

Although FIG. 27 shows only the state when a workpiece moves from the center to the second position, the movement from the first position to the center appears symmetrically. Further, according to this embodiment, the wrist drives the first link 210 and the servo motor M7 of the link rotation means 214 rotates the second link 211. However, it may be inverted such that the wrist rotates the second link 211 and the servo motor M7 rotates the first link 210.

Figure 33:
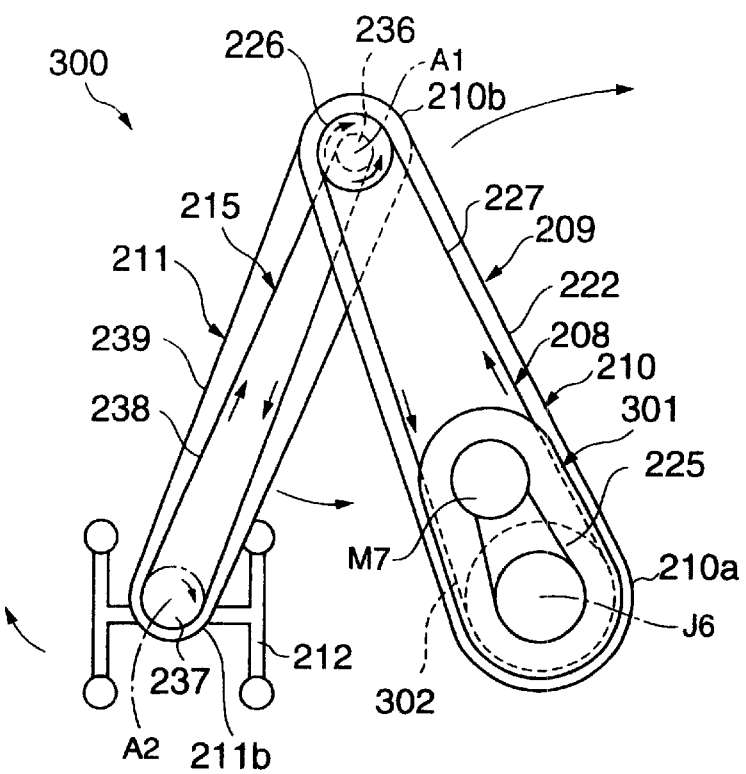
FIG. 33 is a plan view showing the internal mechanism of the transfer device 300 which is another embodiment of the present invention.
Figure 34:
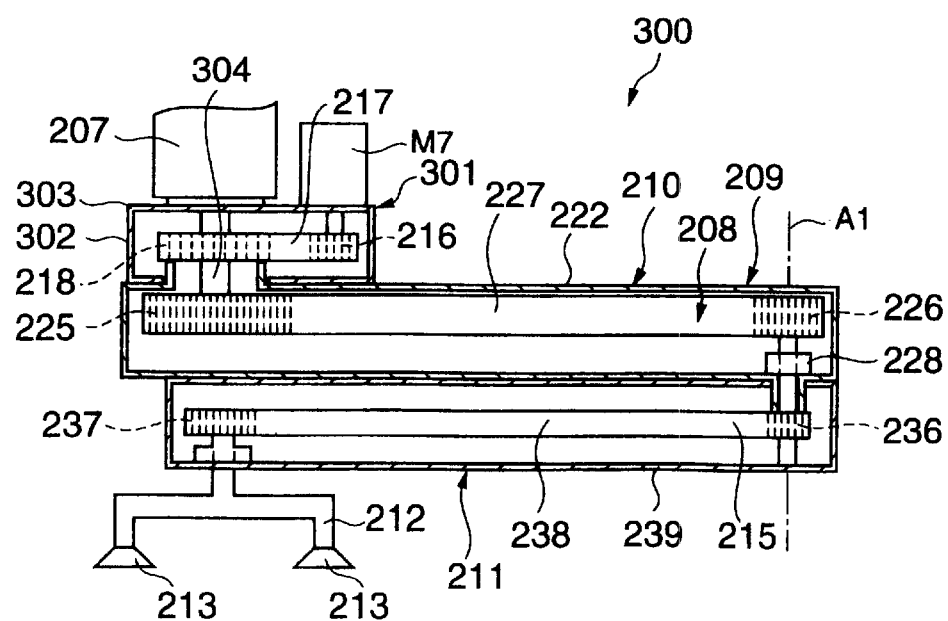
FIG. 34 is a side view showing the internal mechanism of the transfer device 300.

FIG. 33 is a plan view showing the structure of the transfer device 300 of another embodiment of the present invention and FIG. 34 is a side view thereof. Comparing to the transfer device 201 mentioned above, the transfer device 300 are different only in the link rotation means 301 for rotating the link mechanism 209. Then, only the constitution relating to the link rotation means 301 will be explained in detail hereunder and regarding the other constitutions, the same reference numerals as those of the transfer device 201 are assigned and the explanation will be omitted.

The link mechanism 209 includes the first link 210, the second link 211, the link rotation means 301 having a base 302 and the servo motor M7, and the rotation transmitting means 215 for transmitting the rotation of the second link 211 with respect to the first link 210 to the holding means 212 and rotating the holding means 212.

The first link 210 has the hollow first link body 222 and the base 302 of the link rotation means 301 is installed at the proximal end 210a. The base 302 is fixed to the wrist 207 and driven by the wrist 207 to rotate around the sixth axis J6. The proximal end 210a of the first link 210 is connected to the base 302 so as to rotate around the sixth axis J6.

The first solar gear 225 is installed on the side of the proximal end 210a in the first link body 222. The servo motor M7 and the gear 218 with the rotational axis J6 is installed on the base 302. The gear 216 is fixed at the end of the rotation axis of the servo motor M7 and the timing belt 217 is wound round the gear 216 and the gear 218. The gear 218 is fixed to the link body 222 of the first link 210. Therefore, when the servo motor M7 is driven, the first link 210 can be driven to rotate around the axis J6.

An insertion hole is formed in the middle of the gear 218 and an axis 304 is inserted into the insertion hole. The axis 304 is extended along the axis J6, and the upper end thereof is fixed to a housing 303 of a base 302, and the first solar gear 225 is fixed to the lower end thereof. Namely, the first solar gear 225 is fixed to the base 302. At the distal end 210b of the first link body 222, the first planet gear 226 is installed and born so as to freely rotate around the rotation axis A1 parallel with the sixth axis J6. A timing belt 227 is wound round the first solar gear 225 and the first planet gear 226. Link rotation means 301 is composed of the servo motor M7, the base 302, the first solar gear 225, the first planet gear 226, and the timing belt 227. The first planet gear 226 is born to the first link body 222 by the bearing 228 so as to freely rotate and fixed to the proximal end 211a of the second link 211 and the second link 211 rotates together with the first planet gear 226.

The second solar gear 236 is installed at the proximal end of the hollow second link body 239, and the second planet gear 237 is installed at the distal end of the same. The holding means 212 is connected to the second planet gear 237 and rotates together with the second planet gear 237. The timing belt 238 is wound round the second solar gear 236 and the second planet gear 237. The rotation transmitting means 215 is composed of the second solar gear 236, the second planet gear 237, and the timing belt 238.

Figure 35:
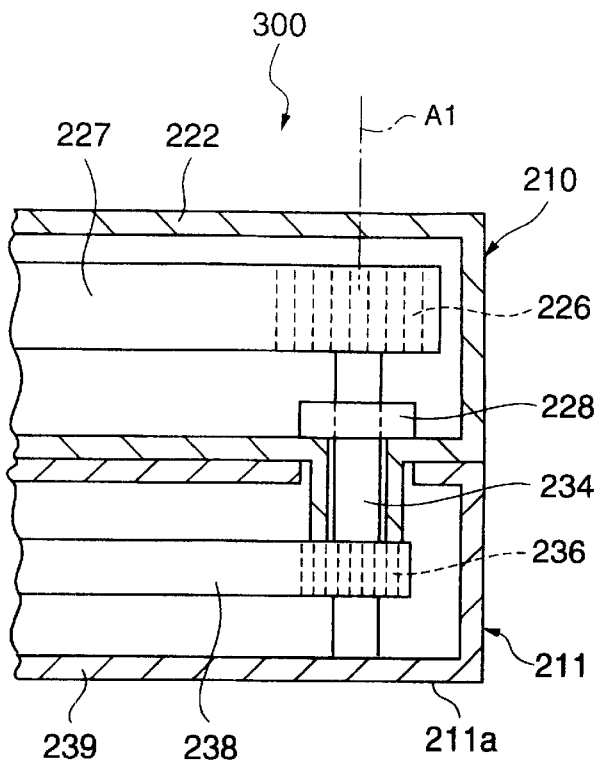
FIG. 35 is a cross sectional view showing the neighborhood of the first planetary gear 226 and the second solar gear 236 of the transfer device 300.

As shown in FIG. 35, the second solar gear 236 is fixedly connected to the first link body 222 and rotates together with the first link 210. The first planet gear 226 and the second solar gear 236 have the rotation axis A1 in common. As shown in FIG. 35, the first planet gear 226 is fixedly connected to the second link body 239 via an axis 234 and rotates around the rotation axis A1 together with the second link 211. The second planet gear 237 is born by the second link body 239 at the distal end 211b of the body of the second link 211 so as to freely rotate around the rotation axis A2 parallel with the rotation axis A1.

Since the timing belt 227 is wound round the first solar gear 225 fixed to the base 302 and the first planet gear 226, as shown in FIG. 33, when the base 302 is fixed to the installation surface (in the absolute coordinate system) free of rotation and the first link 210 is rotated in the first rotational direction (clockwise in FIG. 33) by the servo motor M7, the timing belt 227 rotates as shown by the arrows in FIG. 33, thereby the first planet gear 226 rotates in the second rotational direction (counterclockwise). As described above, the first planet gear 226 and the second link 211 are fixed and rotate together, so that when the first link 210 is driven to rotate in the first rotational direction, the second link 211 can be rotated in the second rotational direction in link motion with the first planet gear 226.

Next, the control operation of the transfer device 300 will be explained. The base 302 is driven to rotate by the wrist 207 so as to keep a fixed angle to the installation surface (in the absolute coordinate system) of the robot 203.

The link rotation means 301 is set so that the first link 210 and the second link 211 are arranged symmetrical about the axis y. Namely, the link rotation means 301 is controlled so that the angle of the first link 210 with respect to the axis y is two times of the angle of the second link 211 with respect to the first link 210. As mentioned above, the base 302 is controlled so that the angle to the absolute coordinate system is kept constant. Then, the link rotation means 301 is set so that the link mechanism 209 rotates with respect to the base 302 as mentioned above. Thereby, the holding means 212 moves along the transfer route L and is transferred linearly from the first position to the second position.

Further, as explained in FIG. 27, when the rotation transmitting means 215 is set so that the rotational angle of the second link 211 with respect to the first link 210 is enlarged to ½ times and transmitted to the holding means 212, an article to be transferred can be transferred free of inversion with the direction kept unchanged. Namely, the number of teeth of the second solar gear 236 is selected to be ½ times of the number of teeth of the second planet gear 237 of the rotation transmitting means 215.

Figure 36:
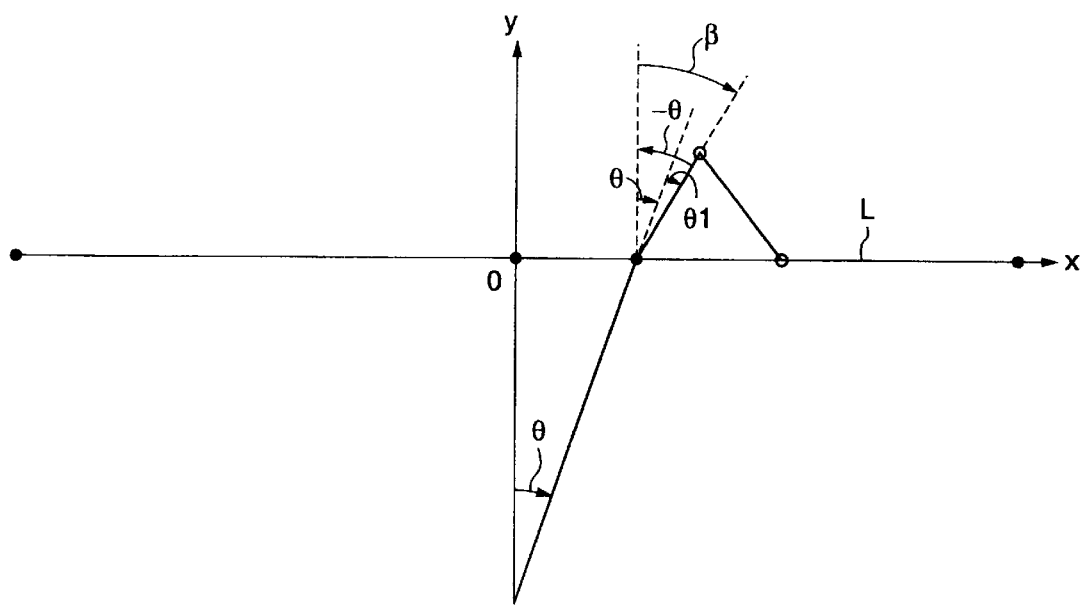
FIG. 36 is a drawing showing the transfer operation of the transfer device 300.

Next, comparing to the transfer device 201 shown in FIGS. 31 and 32, the differences in operation of the transfer device 300 shown in FIGS. 33 and 34 will be explained by referring to FIG. 36.

Both the transfer devices 300 and 201 transfer the workpiece W by moving the wrist 207 of the robot 203 along the transfer route L and opening or closing the first link 210 and second link 211 of the link mechanism 209 symmetrically.

In the transfer device 300, the base 302 is controlled by the wrist 207 not to rotate with respect to the absolute coordinate system. Namely, assuming that the upper arm 206 rotates clockwise in a θ° arc, the base 302 rotates in a θ° arc in the opposite direction (counterclockwise) so as to cancel the rotation.

Therefore, assuming the rotational angle of the first link 210 with respect to the upper arm 206 as θ1°, the movement of the first link 210 viewed from the absolute coordinate system is such that the first link 210 is rotated clockwise in a θ° arc by the upper arm 206 and returned counterclockwise in a θ° arc by the base 302, thereby the base 302 carries out only parallel movement without changing the angular position. Therefore, the rotation of the link mechanism 209 is controlled with respect to the base 302 free of changing in the angular position, so that the link mechanism 209 can be controlled easily. However, motion for offsetting the swing angle θ° of the upper arm 206 is generated by the base 302.

On the other hand, the transfer device 201 rotates the first link 210 directly by the wrist 207 without using the base, so that no motion for offsetting the swing angle θ° of the upper arm is required.

Further, both the transfer device 210 and the transfer device 300 rotate the link mechanism 209 by the servo motor M7 instead of the wrist, so that the moving speed of the upper arm 206 of the robot and the rotational speed of the link can be controlled independently.

Figure 37:
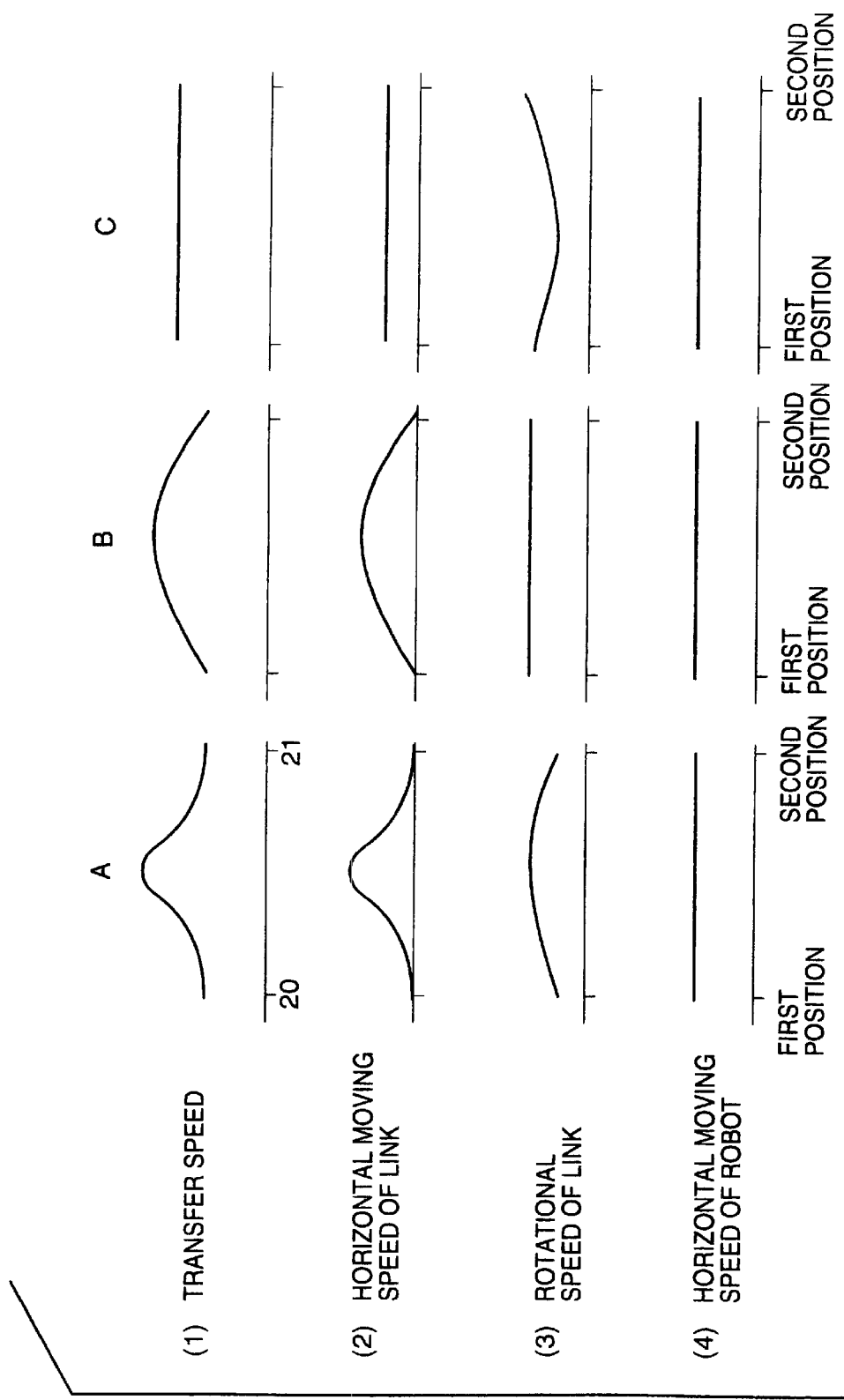
FIG. 37 is a graph showing the transfer speed (1), the link horizontal moving speed (2), the link rotational speed (3), and the robot horizontal moving speed (4) in the three control operation examples A, B, and C.

Next, the transfer speed of the transfer devices 201 and 300 will be explained by referring to FIG. 37. In FIG. 37, (1) indicates the transfer speed of the transfer device, that is, the moving speed of the holding means 212 in the absolute coordinate system, (2) the horizontal moving speed of the link, that is, the moving speed of the holding means 212 when the transfer device is fixed, (3) the rotational speed of the link, and (4) the horizontal moving speed of the robot, that is, the moving speed of the wrist at the distal end of the arm. The transfer speed (1) is the sum of the horizontal moving speed of the transfer device (2) and the horizontal moving speed of the robot (4).

In the example A, the rotational speed of the link (3) is controlled so as to be fastest at the center between the first position and the second position, thereby the transfer speed (1) is controlled so as to be slow in the neighborhood of the first position and the second position and fast at the center.

The link mechanism 209 is folded at the center and the rigidity of the link mechanism 209 is increased, so that the link mechanism 209 can withstand the high transfer speed. Since a article to be transferred is held or released at the first position or the second position, it is necessary to reduce the speed when the article is near these positions and when the speed is controlled as shown in the example A in FIG. 37, the article to be transferred can be transferred efficiently.

In the example B, the rotational speed of the link mechanism 209 (3) is kept constant by the link rotation means. By doing this, the speed difference in the horizontal moving speed of the link (2) between the first and second positions and the central position does not change extremely compared with the example A but changes slowly.

In the example C, the rotational speed of the link is controlled so as to decrease at the center, thereby the horizontal moving speed of the transfer device (2) is made uniform. According to the present invention, as link rotation means for rotating the link, the servo motor M7 is used instead of the wrist, so that the rotational speed of the link can be optionally controlled like this.

Figure 38:
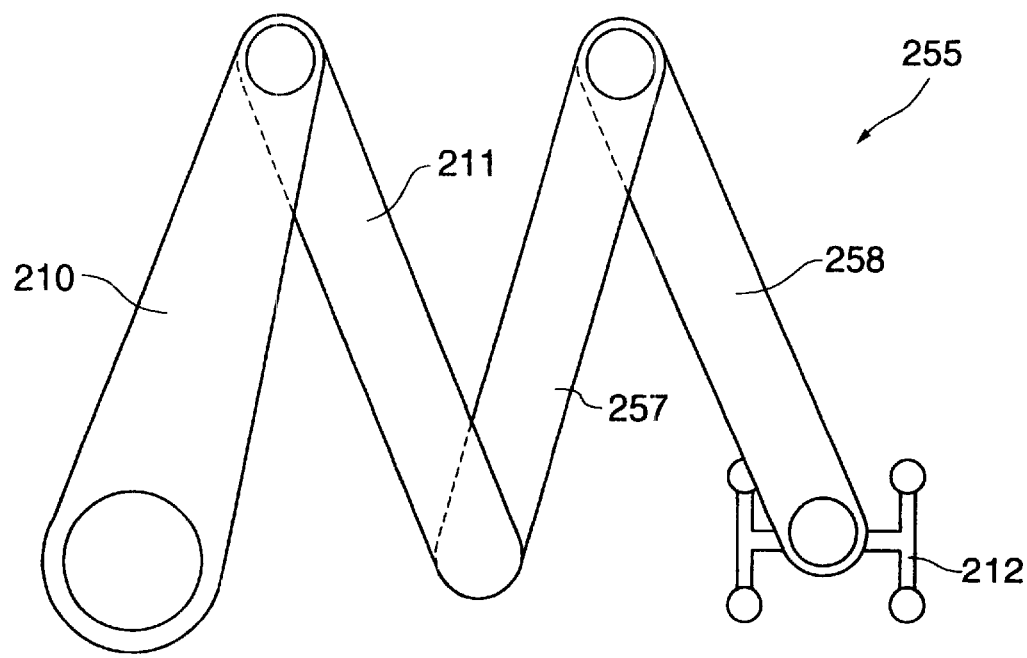
FIG. 38 is a plan view showing the transfer device 255 of another embodiment of the present invention.
Figure 39:
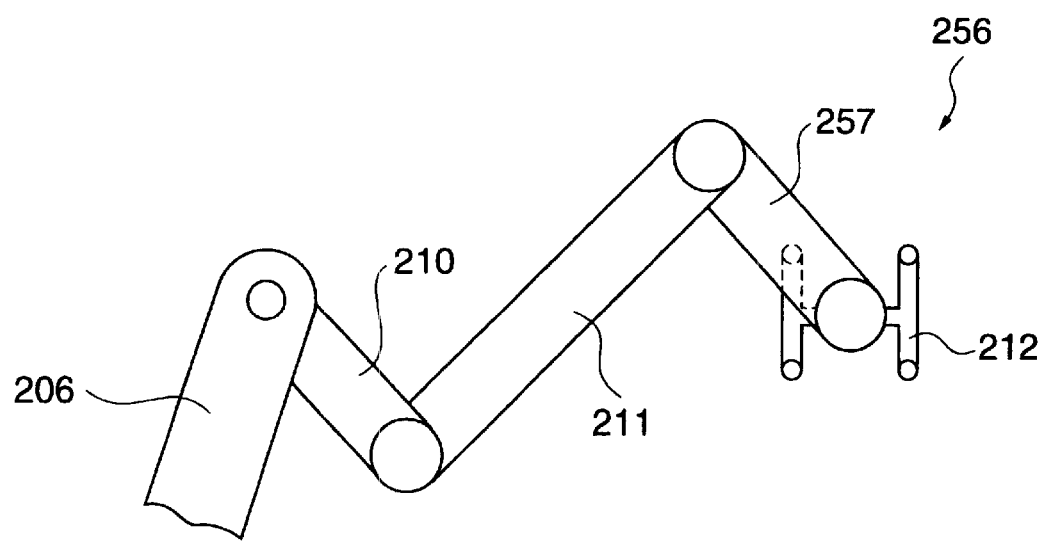
FIG. 39 is a plan view showing the transfer device 256 of still another embodiment of the present invention.

FIGS. 38 and 39 are plan views showing transfer devices 255 and 256 of another embodiment of the present invention. The transfer device 255 is a transfer device to which the link of the link mechanism of the transfer device 201 mentioned above is connected in series and further extended. The transfer device 255 has an M-shaped structure in which a third link 257 is installed at the distal end of the second link 211 and a fourth link 258 is further installed at the distal end of the third link 257. By use of this constitution, the transfer distance can be doubled compared with the transfer device 201. To the third link 257 and the fourth link 258, the rotation of the servo motor M7 of the link rotation means is transmitted respectively by the rotation transmitting means using a gear and a belt.

The transfer device 256 shown in FIG. 39 has a constitution that the length of the second link 211 is doubled and only the third link 257 is installed. By use of such a reverse N-shaped structure, the structure is simplified compared with the transfer device 255 shown in FIG. 38 and the transfer device 156 can be structured so as to have the same transfer distance as that of the transfer device 255.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A robot system including a 6-axis robot, comprising:
   a swingable arm for transferring a workpiece between a first position and a second position,
   a wrist mounted on a distal end of said arm, said wrist being driven to rotate around a predetermined axis, and
   a transfer device disposed at said wrist,
   wherein said transfer device has a link mechanism having a first link and a second link and holding means attached to a distal end of said second link,
   wherein a proximal end of said first link is attached to said wrist so as to rotate around said predetermined axis,
   wherein a distal end of said first link and a proximal end of said second link are rotatably connected to each other, and
   wherein in accordance with a swinging motion of said arm, said first link rotates in a first rotational direction with respect to said arm and said second link rotates in a second rotational direction opposite to said first rotational direction with respect to said first link, so that said link mechanism produces a movement of said distal end of said second link having a same direction as a direction in which said distal end of said arm moves so as to transfer the workpiece along a straight line linking said first position and said second position.

2. A robot system according to claim 1, wherein said proximal end of said first link is fixed to said wrist and said first link rotates with respect to said arm by driving said wrist to rotate.

3. A robot system according to claim 2, further comprising rotation transmitting means for transmitting a rotation of said first link with respect to said arm to said second link, thereby rotating said second link with respect to said first link.

4. A robot system according to claim 3, wherein, assuming a swinging angle of said arm from a central position between said first position and said second position as α, said wrist is controlled to rotate so that a rotational angle of said first link with respect to said arm becomes (90−α)/α times of said swinging angle α of said arm, and said rotation transmitting means is set so that a rotational angle of said second link with respect to said first link becomes 180/(90−α) times of said rotational angle of said first link with respect to said arm.

5. A robot system according to claim 4, wherein said holding means is rotatably disposed at said distal end of said second link and said holding means rotates so that a direction of said workpiece held by said holding means in an absolute coordinate system is always kept constant by setting a rotational angle of said holding means with respect to said second link to become ½ times of said rotational angle of said second link with respect to said first link.

6. A robot system according to claim 1, further comprising link rotation means having a seventh axis for driving said link mechanism,
   wherein, when transferring said workpiece, said link rotation means drives one of said first link and said second link to rotate and said wrist drives the other of said first link and said second link to rotate.

7. A robot system according to claim 6, wherein, assuming a swinging angle of said arm from a central position between said first position and said second position as θ, a rotational angle of said first link with respect to said arm as θ1, and a rotational angle of said second link with respect to said first link as θ2, said link rotation means drives either of said first link and said second link to rotate so that θ2=2(θ+θ1) is held.

8. A robot system according to claim 7, wherein said holding means is rotatably disposed at said distal end of said second link and said holding means rotates so that a direction of said workpiece held by said holding means in an absolute coordinate system is always kept constant by setting a rotational angle of said holding means with respect to said second link to become ½ times of said rotational angle of said second link with respect to said first link.

9. A robot system according to claim 6, wherein, when said wrist is moved along said straight line at a constant speed to transfer said workpiece, rotational speeds of said first and second links of said link mechanism can be controlled independently of a rotational speed of said wrist.

10. A robot system according to claim 1, further comprising a base fixed to said wrist and link rotation means having a seventh axis for driving said link mechanism,
    wherein said proximal end of said first link is rotatably disposed at said base, and
    wherein, when transferring said workpiece, said link rotation means drives said first link to rotate with respect to said base and a rotation of said first link with respect to said base is transmitted to said second link, thereby rotating said second link.

11. A robot system according to claim 10, wherein said wrist controls a rotation of said base so that a direction of said base in an absolute coordinate system is always kept constant during a transfer of said workpiece.

12. A robot system according to claim 10, wherein, when said wrist is moved along said straight line at a constant speed to transfer said workpiece, rotational speeds of said first and second links of said link mechanism can be controlled independently of a rotational speed of said wrist.

13. A robot system according to claim 2, wherein, when transferring said workpiece, said wrist is moved at a constant speed and a rotational speed of said first link with respect to said arm when said wrist is in a neighborhood of said first position and said second position is lower than the rotational speed when said wrist is in a neighborhood of a central position between said first position and said second position.

14. A robot system according to claim 2, wherein, when transferring said workpiece, a moving speed of said wrist when said wrist is in a neighborhood of said first position and said second position is higher than the moving speed when said wrist is in a neighborhood of a central position between said first position and said second position and thereby a rotational speed of said first link with respect to said arm is kept substantially constant.

15. A robot system according to claim 1, wherein said link mechanism comprises at least three links including said first link and said second link, said at least three links being connected in series.

* * * * *